United States Patent [19]
Togashi

[11] Patent Number: 5,889,878
[45] Date of Patent: Mar. 30, 1999

[54] MOVING OBJECT IMAGE PICKUP APPARATUS

[75] Inventor: Yuichi Togashi, Urayasu, Japan

[73] Assignee: Kabushiki Kaisha Toshiba, Kawasaki, Japan

[21] Appl. No.: 508,896

[22] Filed: Jul. 28, 1995

[30] Foreign Application Priority Data

Jul. 29, 1994 [JP] Japan .................................. 6-179249
Mar. 7, 1995 [JP] Japan .................................. 7-047549

[51] Int. Cl.⁶ ........................................................ G06K 9/78
[52] U.S. Cl. ........................ 382/103; 382/104; 382/106; 382/107; 348/222; 348/363
[58] Field of Search .................................. 382/103, 104, 382/106, 107, 173; 348/169, 170, 171, 172, 148, 149, 154, 155, 352, 345, 362–365, 222, 363; 340/958, 435, 903, 937

[56] References Cited

U.S. PATENT DOCUMENTS

| | | | |
|---|---|---|---|
| 4,647,975 | 3/1987 | Alston et al. | 348/222 |
| 4,805,018 | 2/1989 | Nishimura et al. | 348/172 |
| 4,908,704 | 3/1990 | Fujoka et al. | 348/155 |
| 4,910,600 | 3/1990 | Kondo | 348/221 |
| 5,034,986 | 7/1991 | Karmann et al. | 382/100 |
| 5,103,305 | 4/1992 | Watanabe | 382/236 |
| 5,134,472 | 7/1992 | Abe | 348/700 |
| 5,195,144 | 3/1993 | Le Parquier et al. | 382/100 |
| 5,218,414 | 6/1993 | Kajiwara | 356/3.14 |
| 5,243,663 | 9/1993 | Kudoh | 382/100 |
| 5,282,045 | 1/1994 | Mimura et al. | 348/352 |
| 5,387,930 | 2/1995 | Toh | 348/222 |

OTHER PUBLICATIONS

Stable Position Measurement of a Moving airplane by Adaptive Camera control, Proc.MVA'94, pp. 518 to 527 (1994), Togashi, Yuichi et al.

*Primary Examiner*—Jon Chang
*Attorney, Agent, or Firm*—Pillsbury Madison & Sutro LLP

[57] ABSTRACT

An ITV camera picks up an image of an image pickup region including a moving object and a fixed object which serves as a reference to measure a distance. Images are fetched through the ITV camera at a first aperture which discriminates between a background and the fixed object and a second aperture which discriminates between the background and the moving object. The images thus fetched are added together and edges (outlines) of the fixed object and the moving object from the added image. A distance between the fixed object and the moving object is calculated from the extracted edges. The optimal aperture, enlargement ratio and focal lengths are automatically determined in a short period of time in accordance with the image pickup region and an optimal image is provided.

11 Claims, 30 Drawing Sheets

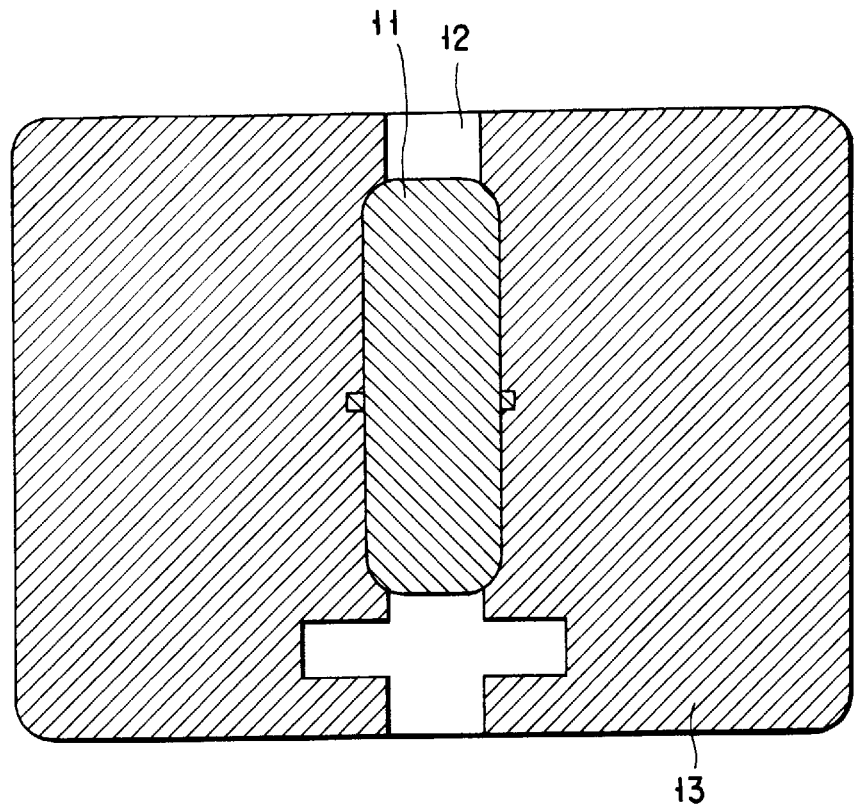
F I G. 1
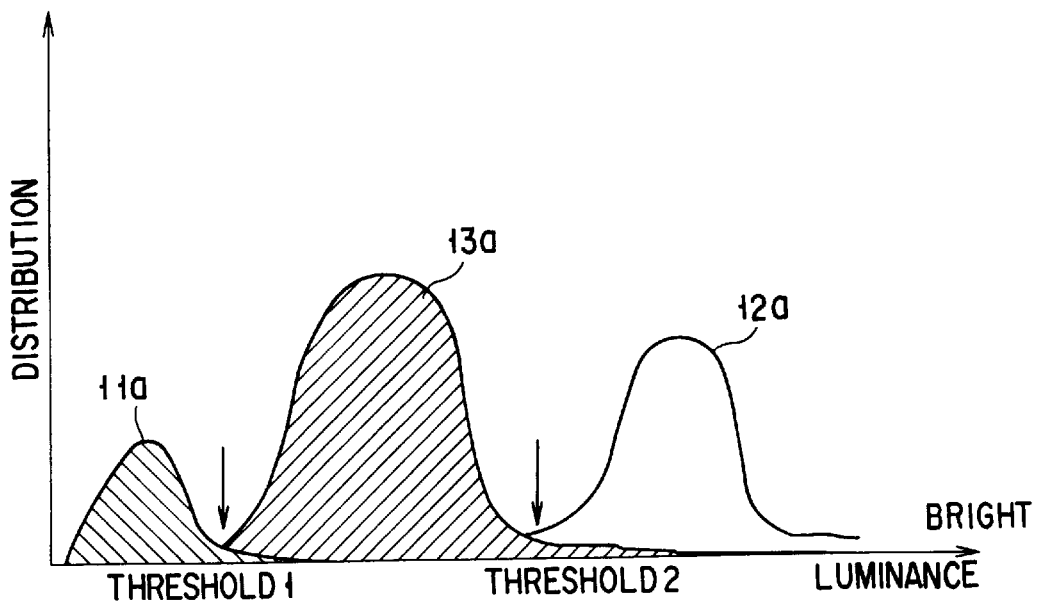
F I G. 2

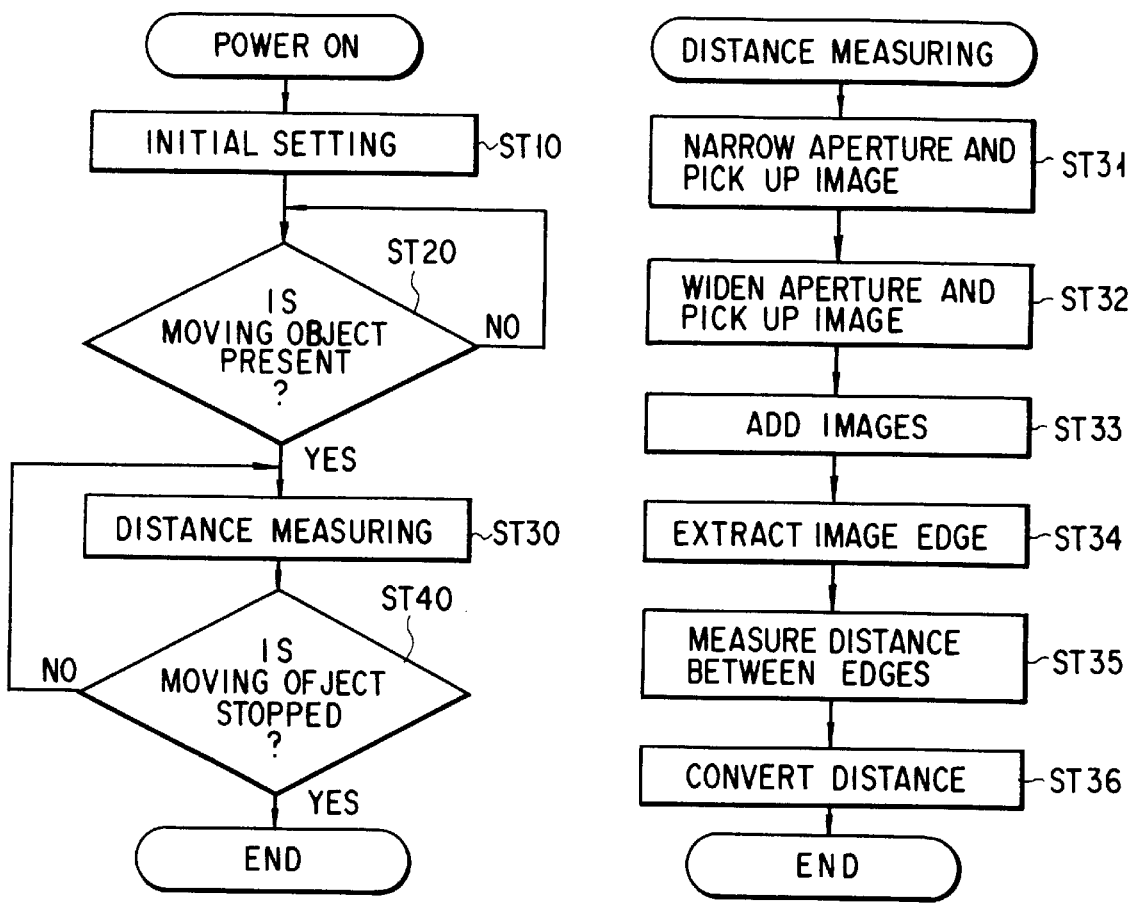
FIG. 5
FIG. 7
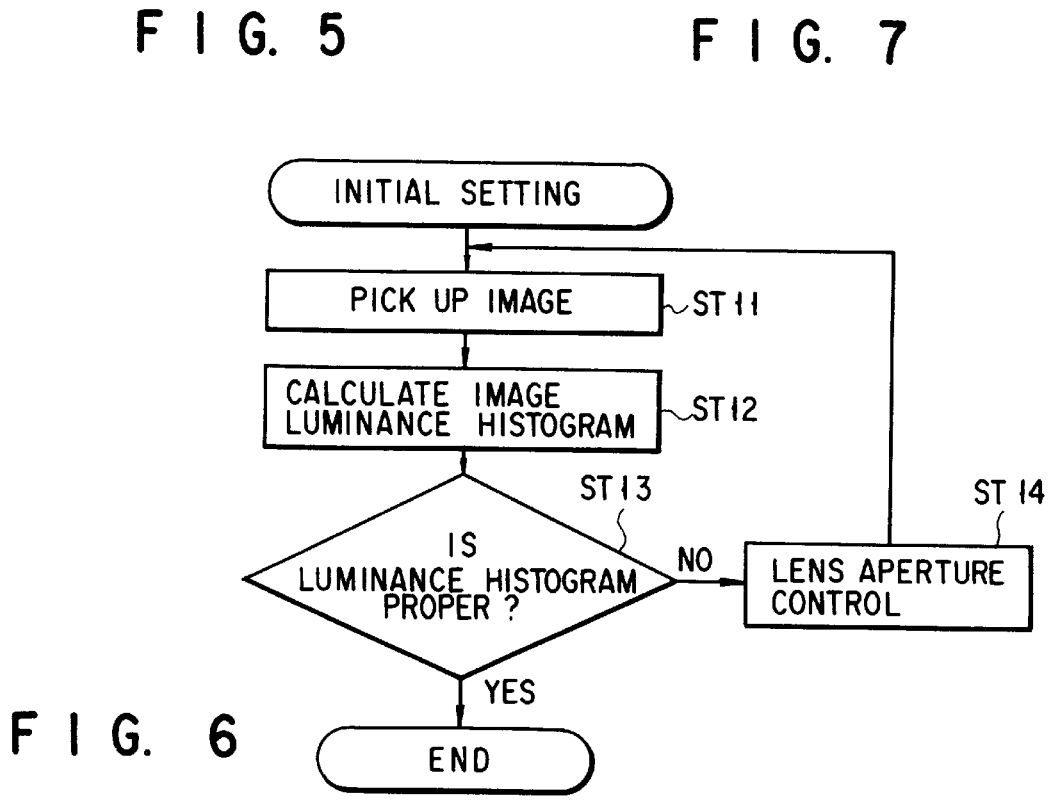
FIG. 6

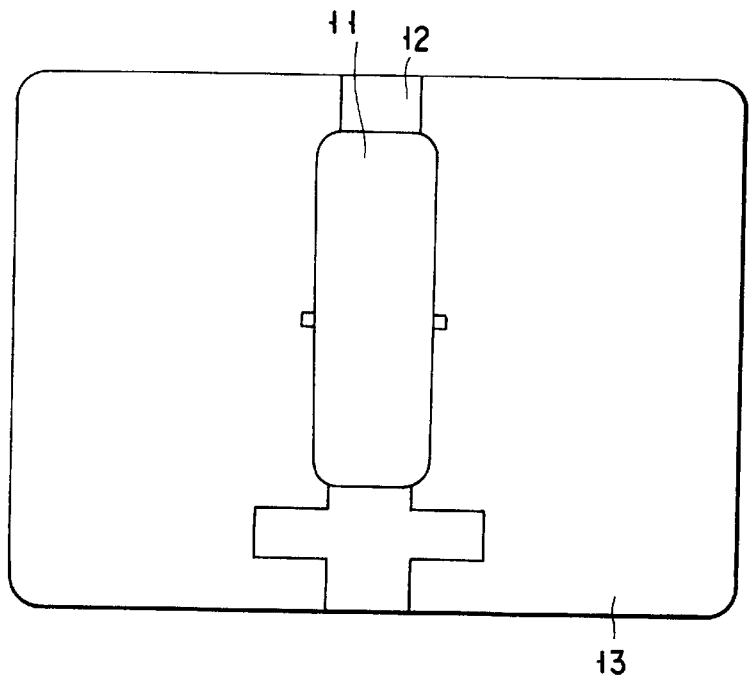
F I G. 14
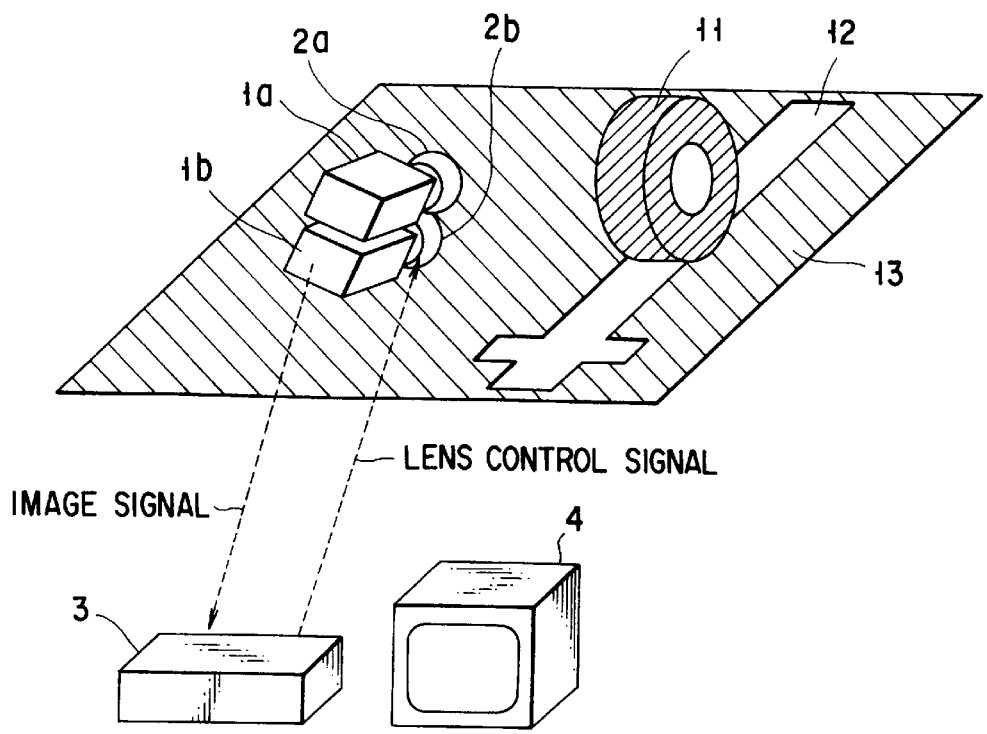
F I G. 15

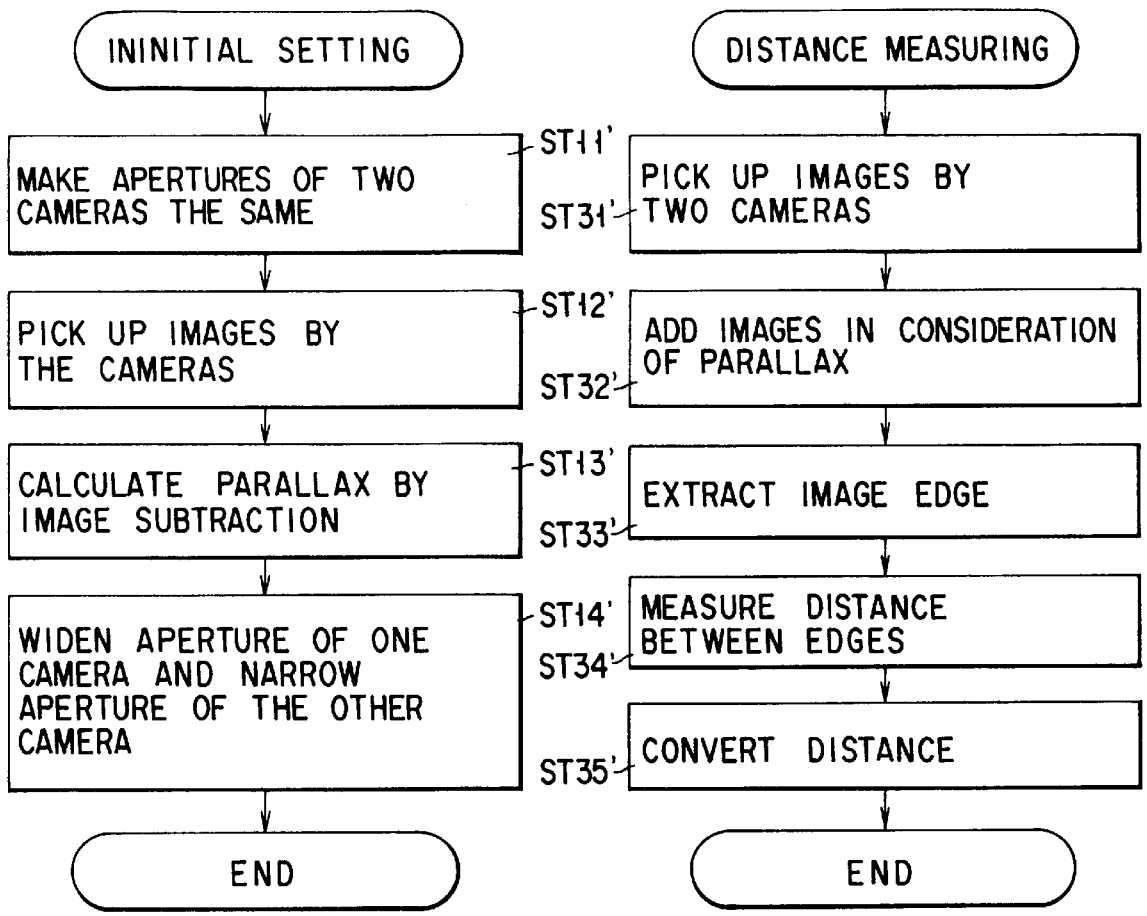
F I G. 17   F I G. 18
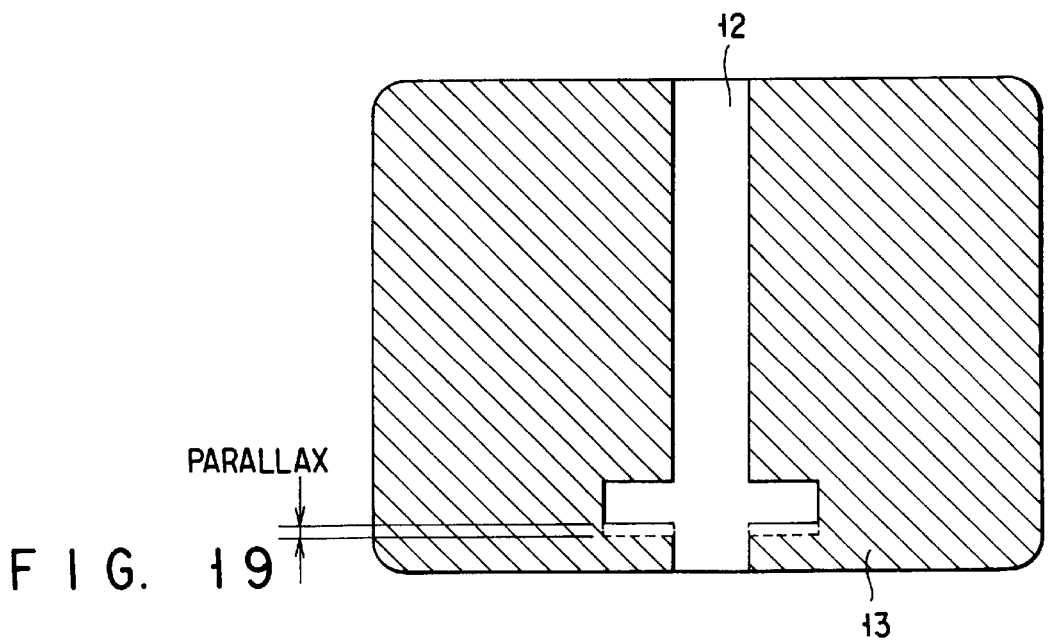
F I G. 19

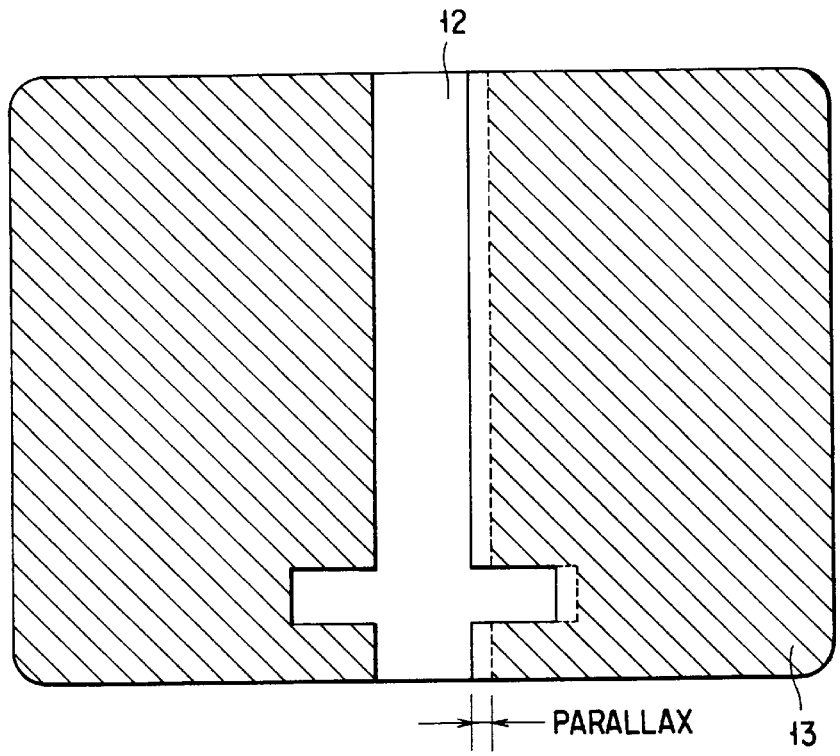
F I G. 22
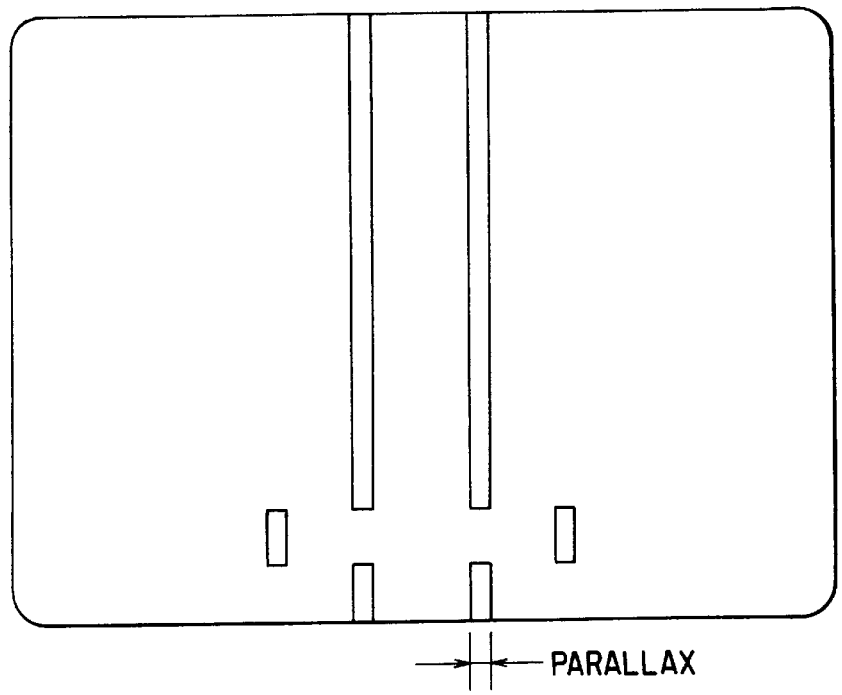
F I G. 23

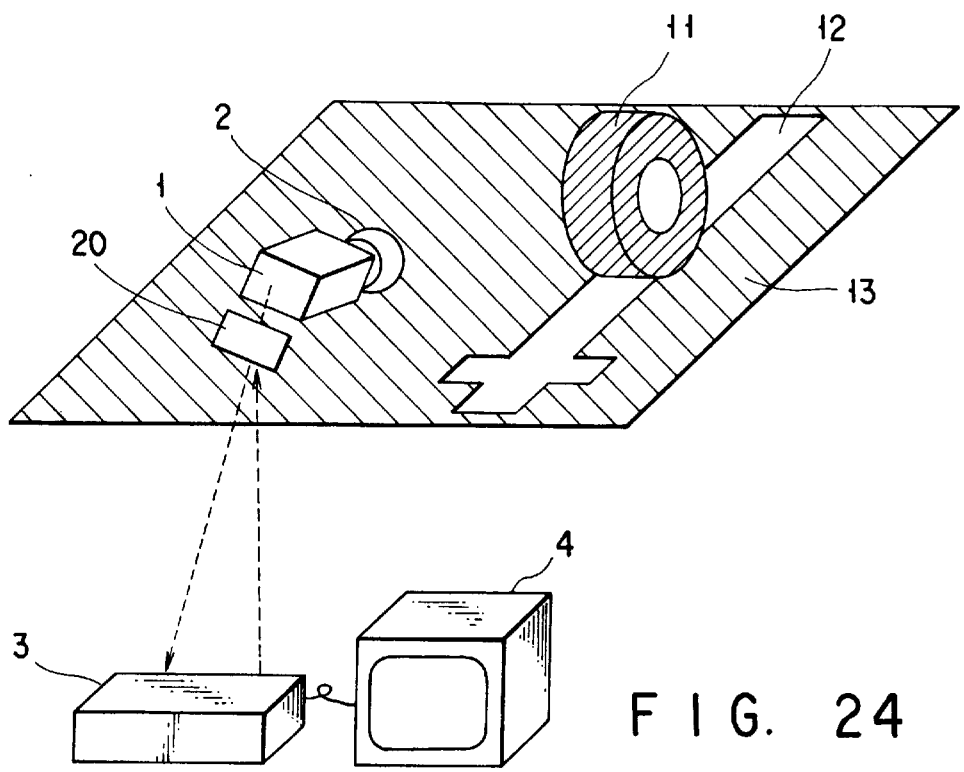
F I G. 24
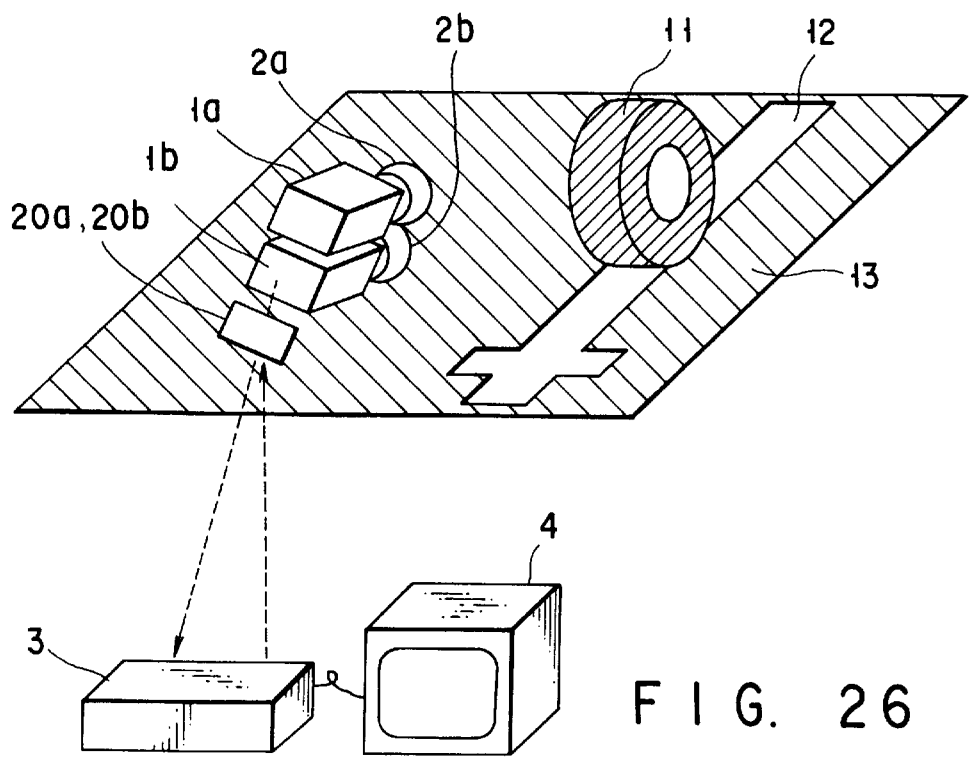
F I G. 26

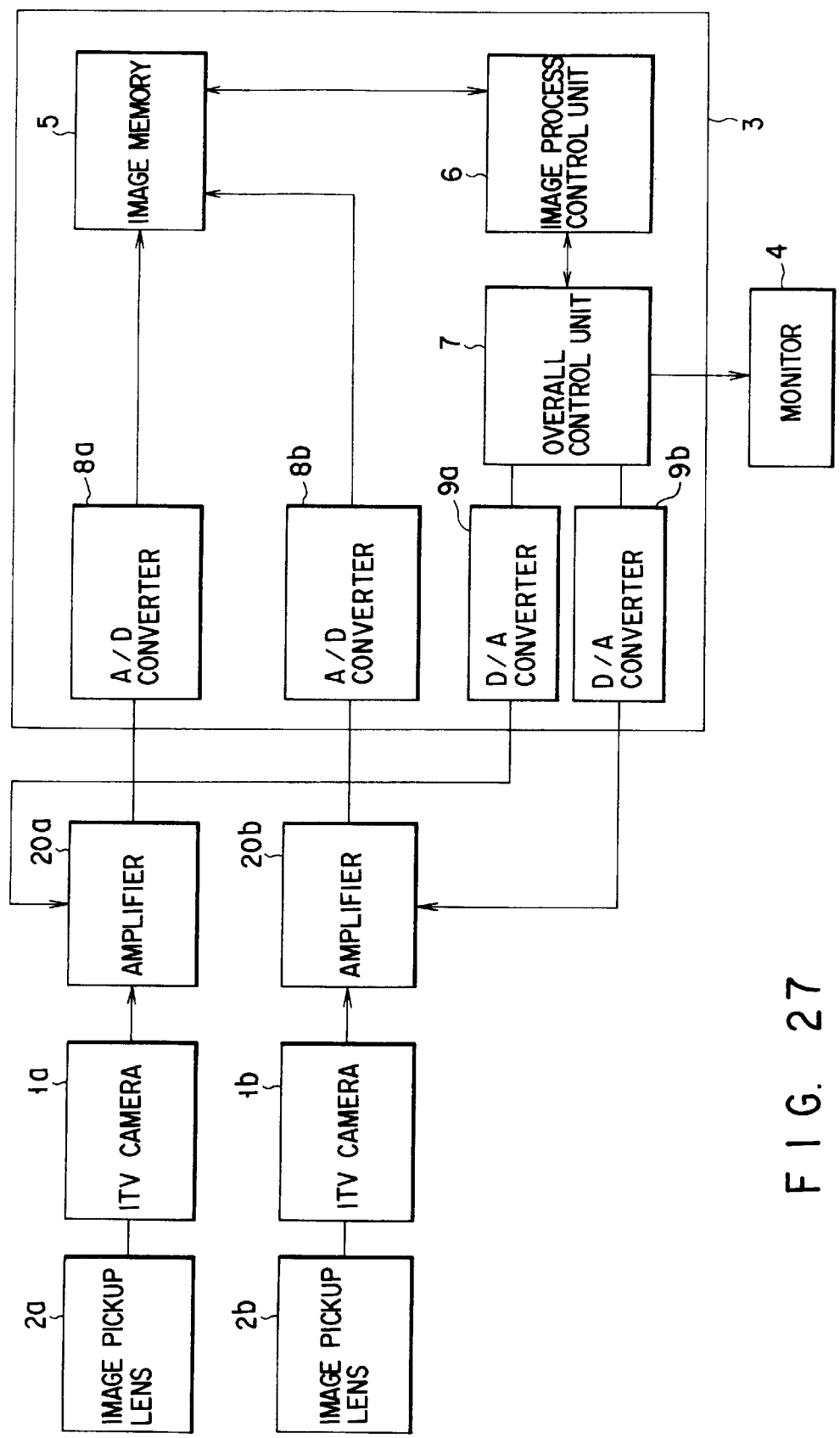
F I G. 27

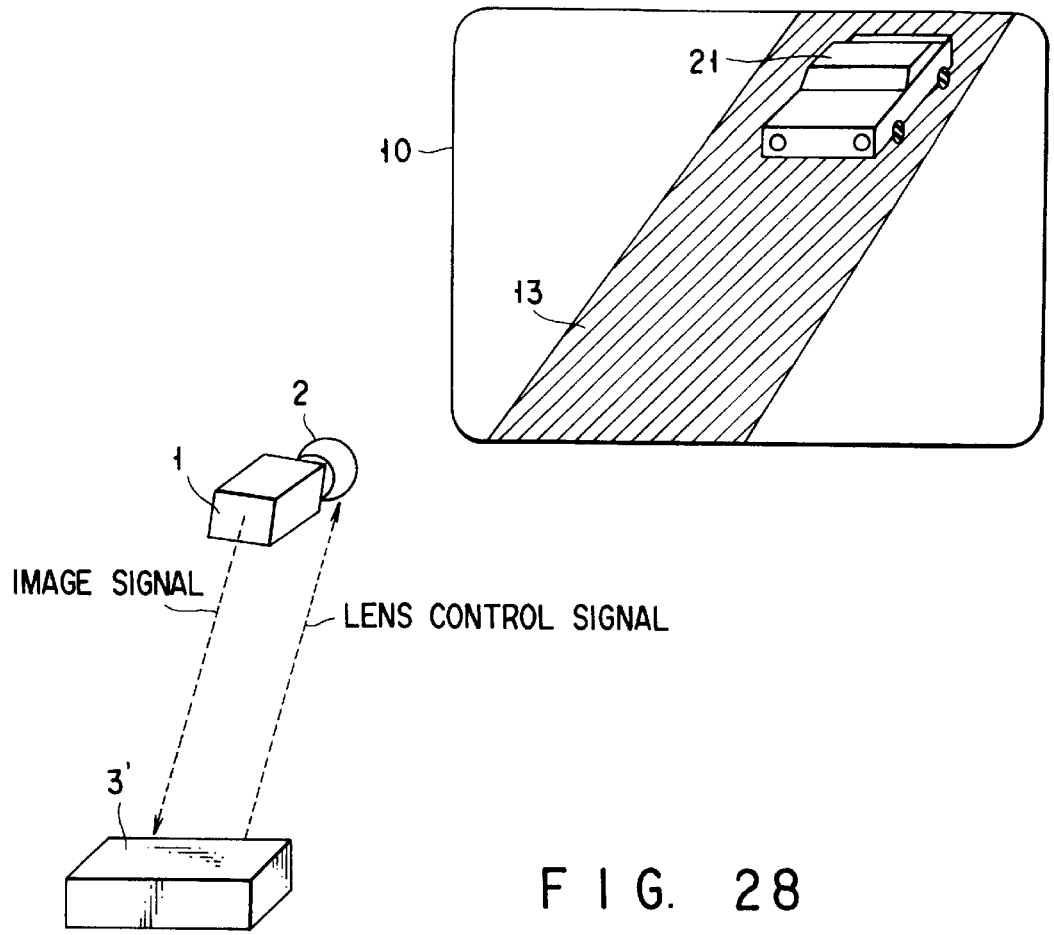
F I G. 28
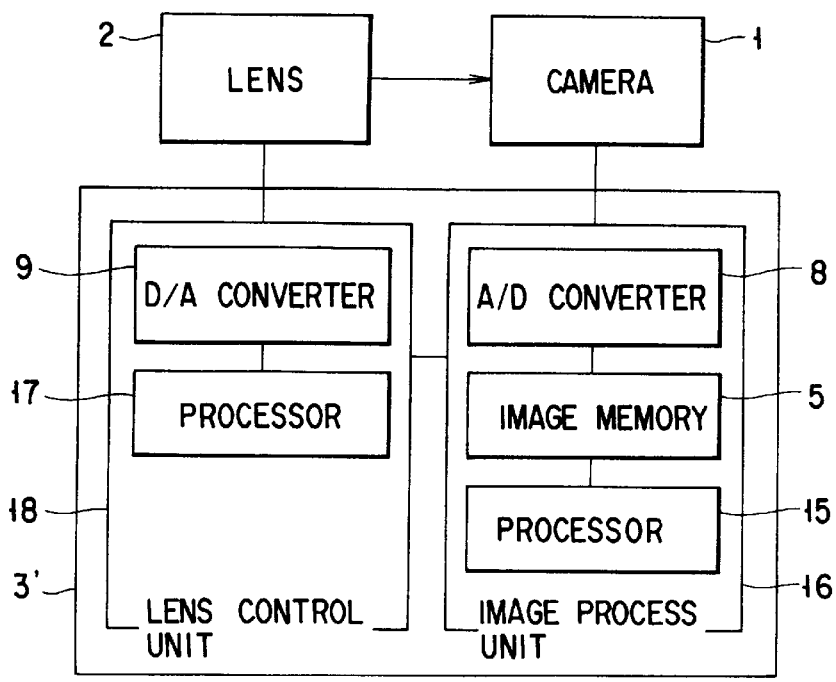
F I G. 29

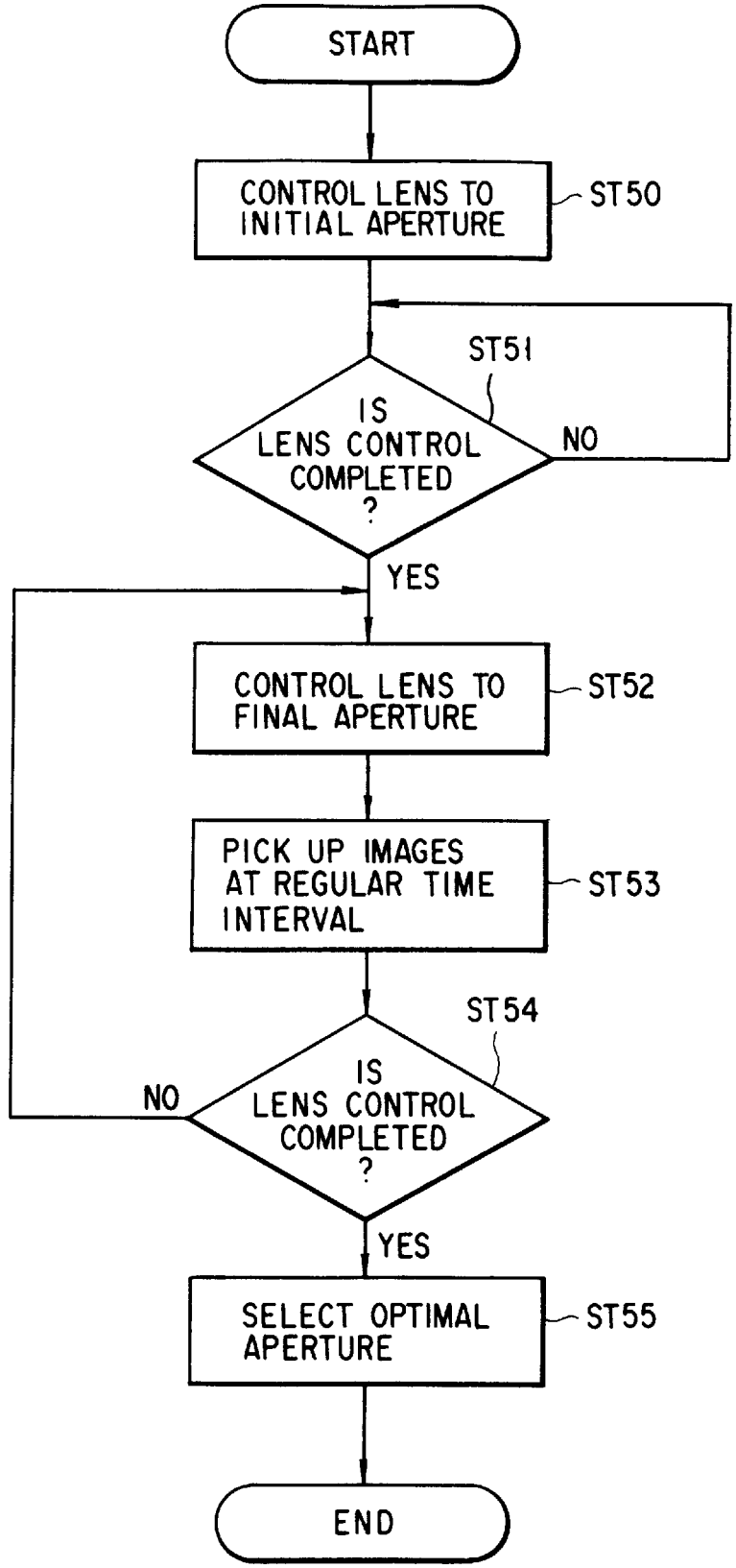
F I G. 30

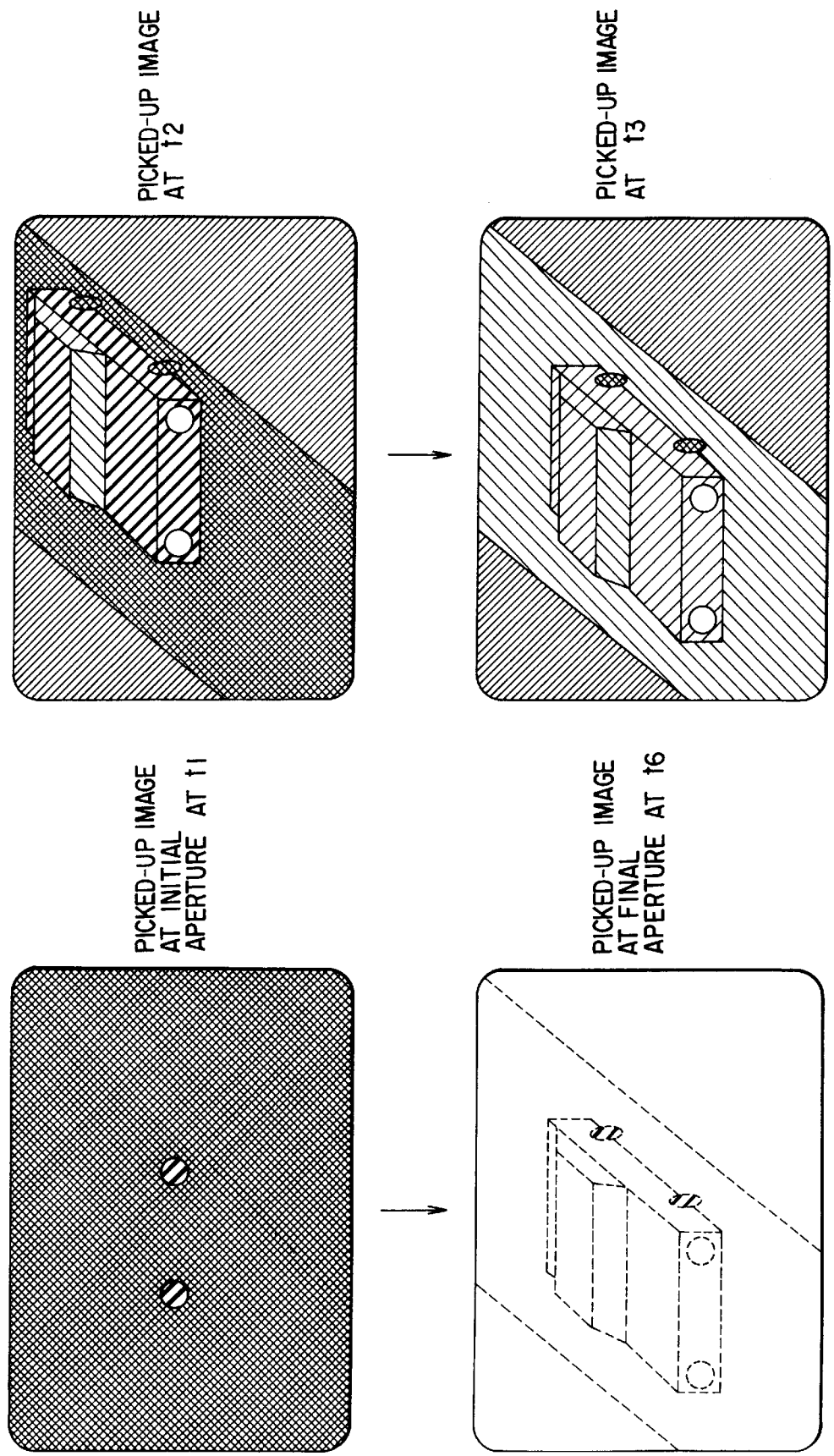

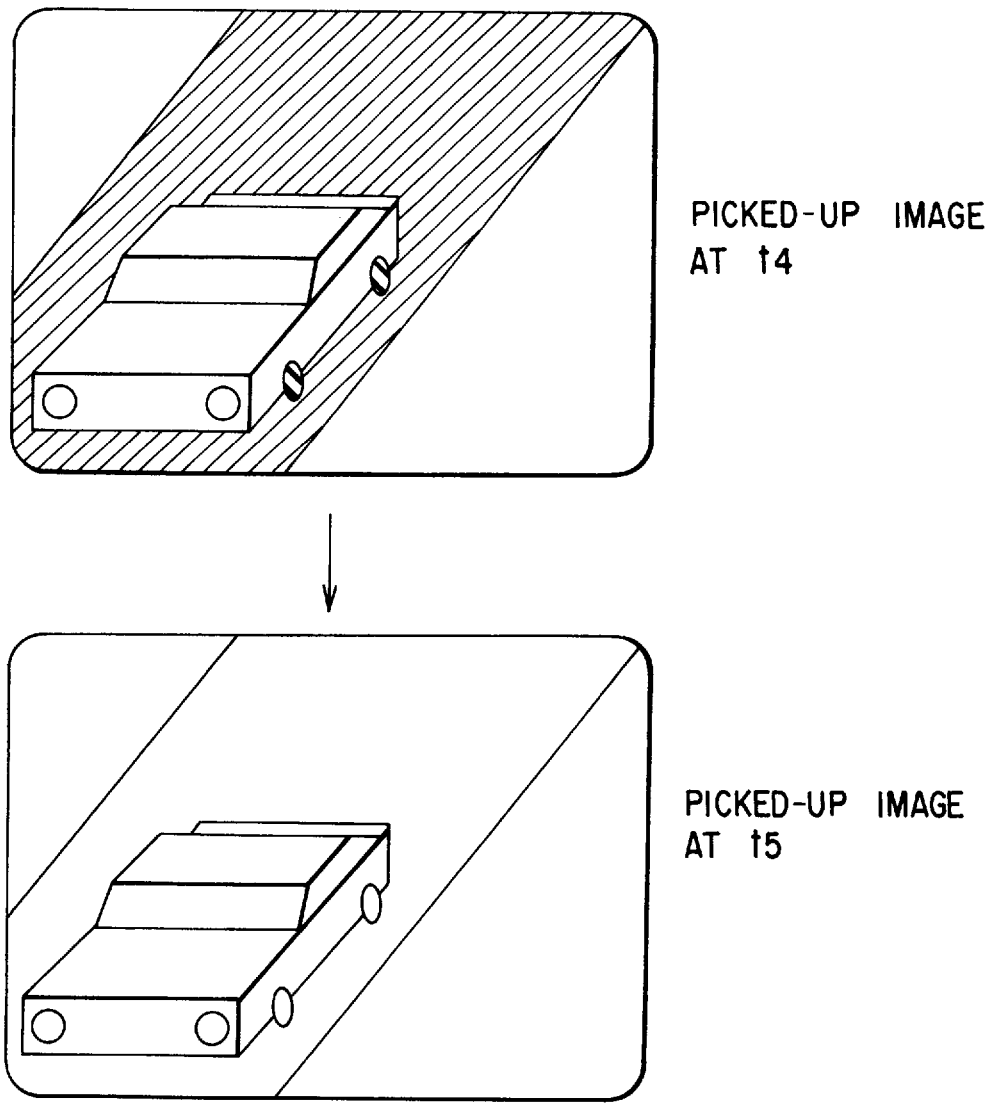
F I G. 35

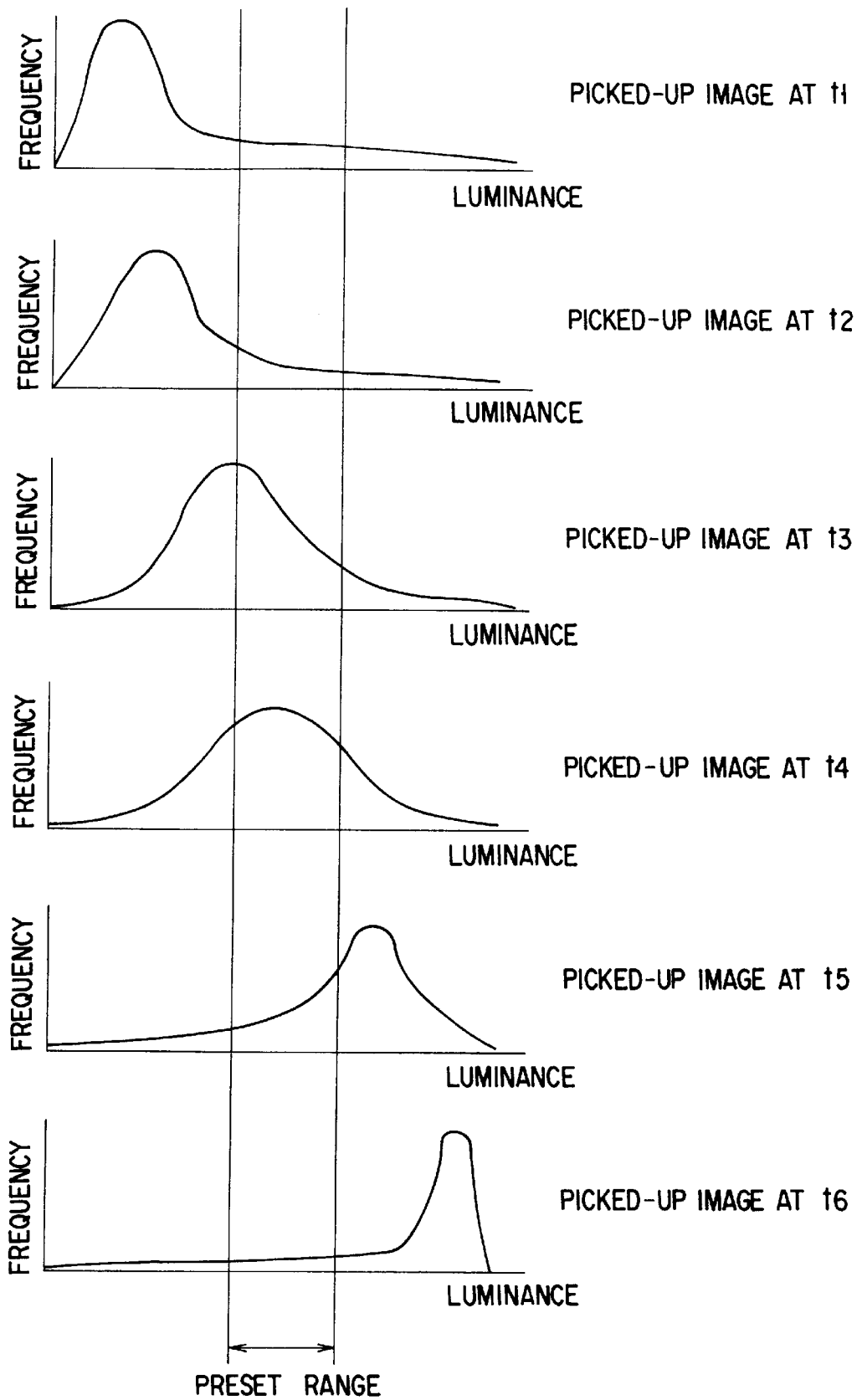
F I G. 36

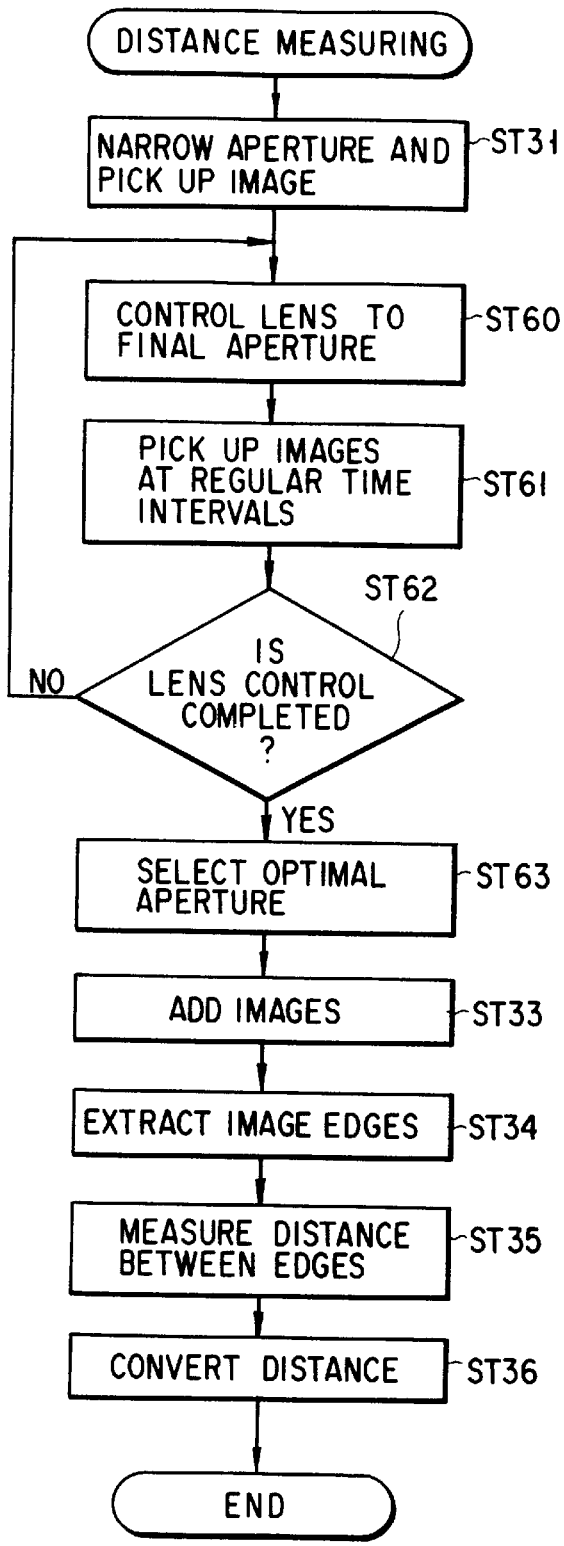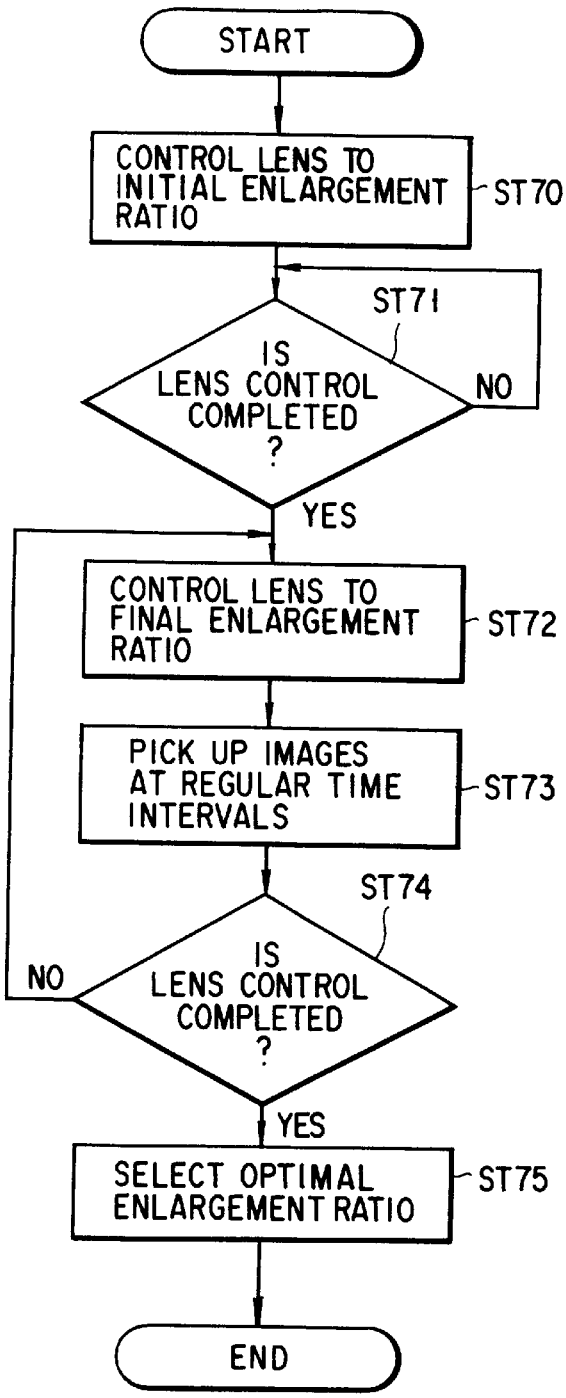
F I G. 37
F I G. 38

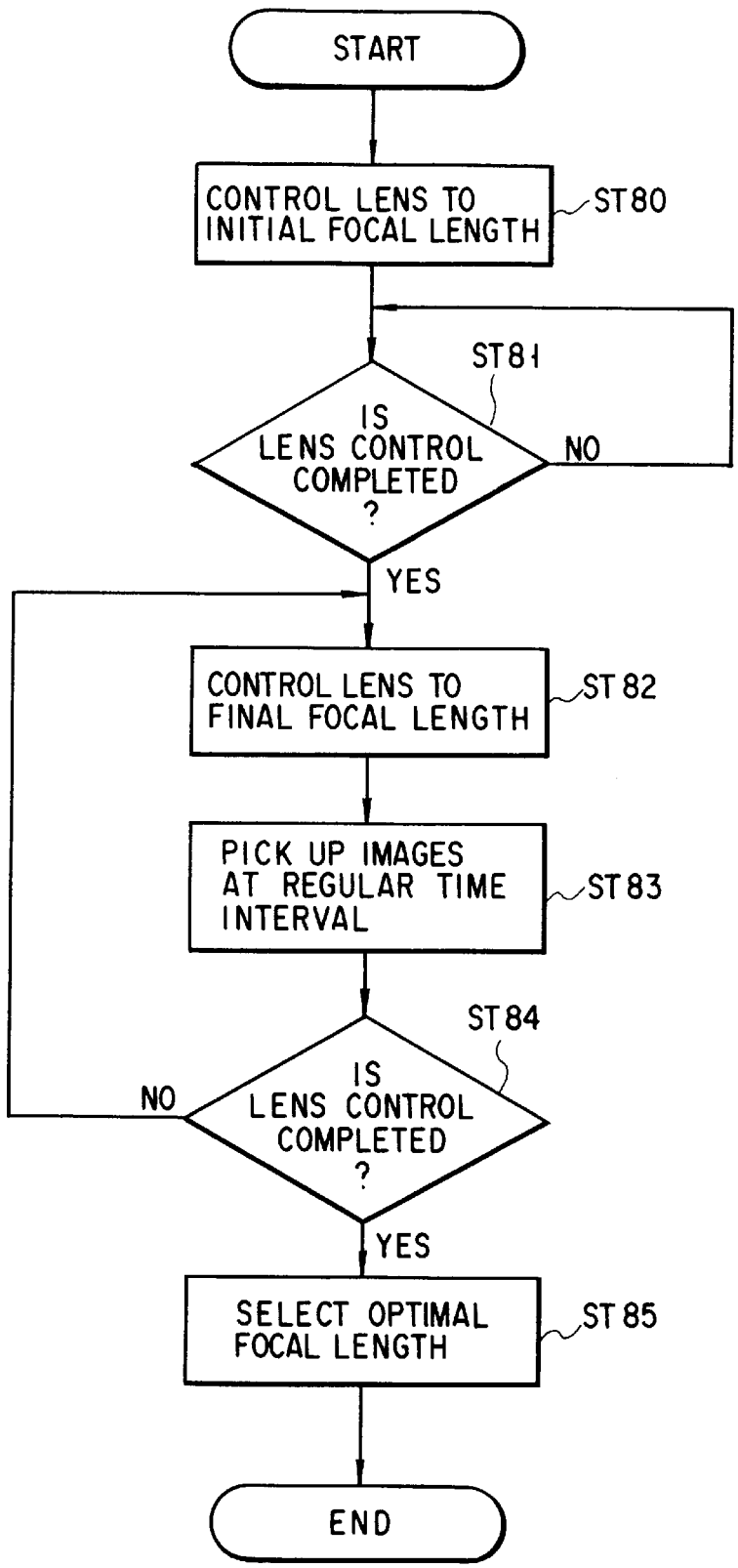
F I G. 46

MOVING OBJECT IMAGE PICKUP APPARATUS

BACKGROUND OF THE INVENTION

1. Field of the Invention

The present invention relates to a moving object image pickup apparatus for detecting the position of a moving object, such as an automobile, running in an image pickup region set on a road surface, and clearly picking up an image of the moving object.

2. Description of the Related Art

The following is a known example of a position detecting device of the aforementioned moving object image pickup apparatus. An ITV (industrial TV) camera, serving as image pickup means, continuously picks up a plurality of images in an image pickup region including a moving object and a fixed object. The images are stored in an image memory. The contents of the image memory are analyzed to calculate a position of the moving object, which is displayed on a screen of a monitor.

For example, FIG. 1 shows an example of an image picked up by an ITV camera. In this case, as shown in FIG. 1, the positional relationship between a fixed object 12 (e.g., a white line on a road surface 13, serving as a reference) and a moving object 11 (e.g., a tire of an aircraft or an automobile) is to be determined. FIG. 2 shows an example of a luminance distribution of the picked-up image. In FIG. 2, reference numerals 11a, 12a and 13a respectively denote luminance distributions of the tire 11, the white line 12 and the road surface 13.

In general, the luminance of the fixed object, i.e., the white line 12, of the picked-up image is greater than that of the road surface 13. Since a suitable threshold (threshold 2) can therefore be calculated from the luminance distribution shown in FIG. 2, the white line 12 can be extracted by converting the image shown in FIG. 1 to binary values using the threshold 2. The extracted image of the white line is projected to X and Y coordinates, and the position of the fixed object (white line 12) in the image shown in FIG. 1 can be obtained on the basis of the projected data.

The luminance of the moving object, the tire 11, is less than that of the other portions. Therefore, the image of the tire 11 can be extracted by converting the image shown in FIG. 1 to binary values using a suitable threshold (threshold 1) calculated from the luminance distribution shown in FIG. 2. The extracted image of the tire 11 is projected to X and Y coordinates, and the position of the moving object (tire 11) can be obtained on the basis of the projected data.

The positions obtained in the manner as described above can be geometrically converted to values on an actual road surface from a position and an angle of the ITV camera and an angle of field, thereby calculating the distance between the moving object and the fixed object.

The conventional moving object image pickup apparatus as described above has a following drawback. If the luminance of the image pickup environment increases, the difference in luminance between a relatively bright object and the other portion is reduced. As a result, the brighter object cannot easily be extracted. On the other hand, if the luminance of the image pickup environment decreases, the difference in luminance between a relatively dark object and the other portion is reduced. As a result, the darker object cannot easily be extracted.

The following is a known example of an apparatus, only for picking up a clear image of a moving object, of the moving object image pickup apparatus. An ITV camera picks up an image including a moving object (automobile) in an image pickup region set on a road surface. The image is stored in an image memory. The content of the image memory is analyzed to generate a lens control signal. The image pickup lens of the ITV camera is controlled by the lens control signal, so that an optimal image can be obtained. The control of the image pick-up lens means controls the enlargement ratio, the aperture, the focal length, etc.

For example, when the enlargement ratio is to be controlled, the picked-up image is analyzed and the enlargement ratio of the image pickup lens is controlled so that an image of the target object (automobile) can be picked up in a size (target value) preset by the operator. More specifically, the image of the moving object is cut off from the overall picked-up image, and if the size of the image of the moving object is greater than the preset size, the enlargement ratio is lowered and an image is picked up and analyzed again. On the other hand, if the size of the image of the moving object of the picked-up image is smaller than the preset size, the enlargement ratio is increased and an image is picked up and analyzed again. This operation is repeated until the size of the image is optimized.

When the aperture is to be controlled, the luminance histogram of the picked-up image is analyzed and the aperture of the image pickup lens is controlled so that the luminance distribution can be a preset optimal distribution (target value). More specifically, if a greater number of pixels are distributed in a high luminance portion of the luminance histogram, the image pickup lens is controlled so as to narrow the aperture, and an image is picked up and analyzed again. If a greater number of pixels are distributed in a low luminance portion of the luminance histogram, the image pickup lens is controlled so as to widen the aperture, and an image is picked up and analyzed again. This operation is repeated until the distribution is optimized.

When the focal length is to be controlled, the frequency distribution of the picked-up image is obtained, and the focal length of the image pickup lens is controlled so that the frequency distribution can be a preset optimal distribution (target value). More specifically, the frequency distribution of the picked-up image is analyzed, while the focal length of the image pickup lens is being changed. The operation is repeated until an image having a component of the highest frequency is obtained.

The above conventional image pickup apparatus as described above, however, is disadvantageous in that the target values such as the enlargement ratio, the aperture, and the focal length must be preset by the operator in accordance with the image region. In addition, when controlling the aperture, it takes a considerable time for the aperture to be changed to a preset value after an aperture control signal is generated. Particularly, in a case of feedback control, the control of the aperture cannot overtake the high-speed movement of the moving object, and an optimal image cannot be obtained.

SUMMARY OF THE INVENTION

An object of the present invention is to provide a moving object image pickup apparatus in which the distance between a fixed object and a moving object can be obtained automatically and accurately, irrespective of the brightness of an image pick-up environment.

Another object of the present invention is to provide a moving object image pickup apparatus in which an image of the optimal enlargement ratio, aperture and focal length can be obtained in a short period of time, without target values having to be set by the operator in advance.

According to an aspect of the present invention, an aperture of an image pickup lens is controlled optimally based on information of the luminance of an image fetched in a first period of time in which a moving object is not present in an image pickup region of an ITV camera. In this state, an image, in which a fixed object can be discriminated from a background, is picked up at a first optimal aperture. Then, an image, in which the moving object can be discriminated from the background, is picked up in a second period of time at a second optimal aperture. The image fetched in the first period of time and the image fetched in the second period of time are added, and edges (outlines) of the fixed object and the moving object in the image pickup region are detected. A distance between the fixed object and the moving object is obtained from the outline images. Therefore, the position of the moving object with respect to the fixed object can be accurately obtained irrespective of the brightness of the image pickup region.

According to another aspect of the present invention, there is provided first and second ITV cameras respectively having image pickup lens of different apertures or amplifiers of different image signal gains. Images picked up by the first and second ITV cameras are added together, so that a distance between a fixed object and a moving object in an image pickup region is obtained. Therefore, the positional relationship between the fixed object and the moving object can be accurately obtained irrespective of the brightness of the image pickup environment.

According to still another aspect of the present invention, images of a moving object are picked up, while an aperture of an image pickup lens mounted on an ITV camera is being changed, so that a plurality of images at different apertures are successively fetched. An image of an optimal aperture is selected from the fetched images. Based on data of the time when the optimal image is fetched, the optimal aperture of the image pickup lens is determined. Thus, an image of an optimal aperture can be automatically obtained in a short period of time, without the operator setting an optimal value as in the conventional art.

According to a further aspect of the present invention, images of a moving object are picked up, while an enlargement ratio of an image pickup lens mounted on an ITV camera is being changed, so that a plurality of images at different enlargement ratios are successively fetched. An image of an optimal enlargement ratio is selected from the fetched images. Based on data of the time when the optimal image is fetched, the optimal enlargement ratio of the image pickup lens is determined. Thus, an image of an optimal enlargement ratio can be automatically obtained in a short period of time, without the operator setting an optimal value by the operator as in the conventional art.

According to a still further aspect of the present invention, images of a moving object are picked up, while a focal length of an image pickup lens mounted on an ITV camera is being changed, so that a plurality of images at different focal lengths are successively fetched. An image of an optimal focal length is selected from the fetched images. Based on data of the time when the optimal image is fetched, the optimal focal length of the image pickup lens is determined. Thus, an image of an optimal focal length can be automatically obtained in a short period of time, without setting an optimal value by the operator as in the conventional art.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1 is a diagram showing an image picked up by an ITV camera;

FIG. 2 is a histogram showing a luminance distribution of the image shown in FIG. 1;

FIG. 5 is a flowchart showing the overall operation according to first and second embodiments;

FIG. 6 is a flowchart showing an initial setting process according to the first embodiment;

FIG. 7 is a flowchart showing a process of measuring the position of a moving object according to the second embodiment;

FIG. 14 is a diagram showing an image of the extracted edge of an object according to the first and second embodiments;

FIG. 15 is a schematic diagram showing a moving object image pickup apparatus according to a second embodiment of the present invention;

FIG. 17 is a flowchart showing an initial setting process according to the second embodiment;

FIG. 18 is a flowchart showing a process of measuring the position of a moving object according to the second embodiment;

FIG. 19 is a diagram showing an initial image first picked up in initial setting according to the second embodiment;

FIG. 22 is a diagram showing an initial image first picked up in initial setting according to the embodiment shown in FIG. 21;

FIG. 23 is a diagram showing a parallax image obtained in the embodiment shown in FIG. 21;

FIG. 24 is a schematic diagram showing a moving object image pickup apparatus according to a third embodiment of the present invention;

FIG. 26 is a schematic diagram showing a moving object image pickup apparatus according to a fourth embodiment of the present invention;

FIG. 27 is a block diagram showing a processor unit according to the fourth embodiment;

FIG. 28 is a schematic diagram showing a moving object image pickup apparatus according to a fifth embodiment of the present invention;

FIG. 29 is a block diagram showing a processing apparatus according to the fifth embodiment;

FIG. 30 is a flowchart showing a control operation according to the fifth embodiment;

FIG. 33 is a diagram showing examples of images picked up at an initial aperture and a final aperture according to the fifth embodiment;

FIG. 34 is a diagram showing examples of images picked up at apertures between the initial and final apertures according to the fifth embodiment;

FIG. 35 is a diagram showing examples of images picked up at apertures between the initial and final apertures according to the fifth embodiment;

FIG. 36 is a diagram showing luminance histograms of picked-up images according to the fifth embodiment;

FIG. 37 is a flowchart showing a control operation according to a sixth embodiment;

FIG. 38 is a flowchart showing a control operation according to a seventh embodiment;

FIG. 46 is a flowchart showing a control operation according to an eighth embodiment;

DETAILED DESCRIPTION OF THE PREFERRED EMBODIMENTS

Embodiments of the present invention will be described with reference to the accompanying drawings. First, the present invention is applied to an apparatus for detecting a position of an object moving near a fixed object. In the embodiments, a white line on a road surface is assumed to be a fixed object, and a position of a tire of an aircraft or an automobile, moving near the white line, is detected.

Figure 3:
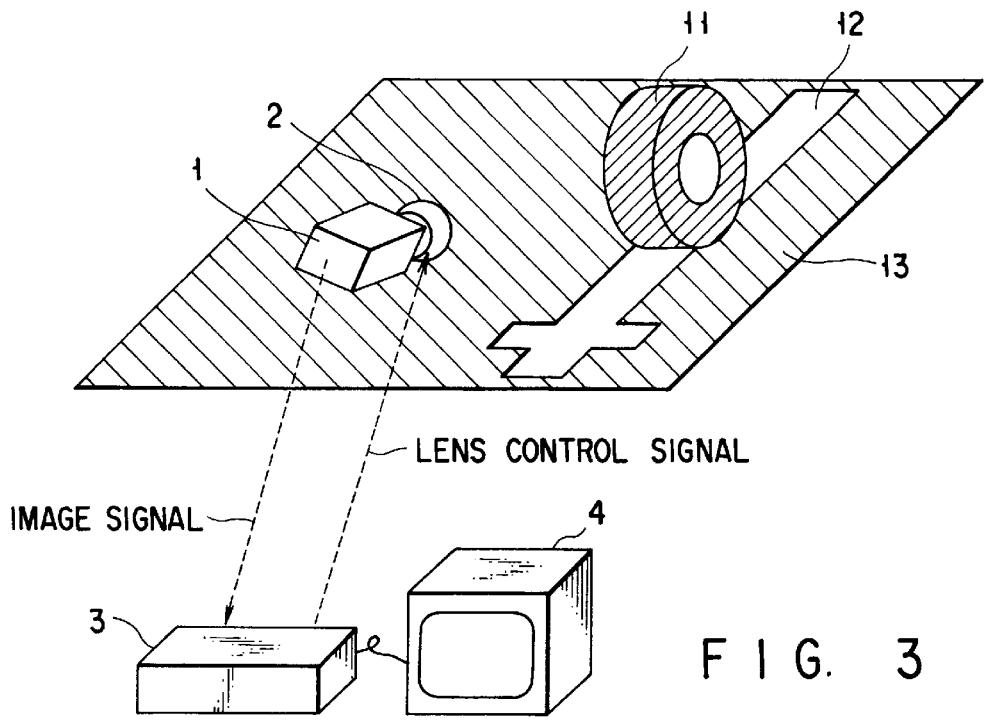
FIG. 3 is a schematic diagram showing a moving object image pickup apparatus according to a first embodiment of the present invention.

FIG. 3 shows an appearance of a moving object image pickup apparatus according to a first embodiment. An ITV camera 1 serving as image pickup means comprises an image pickup lens 2. The aperture, enlargement ratio and focal length of the lens 2 can be externally controlled. The ITV camera 1 picks up an image in an image pickup region including a fixed object (white line) 12 and a moving object (tire) 11 on a road surface 13 and converts an optical signal to an electrical signal. An image signal corresponding to the image picked up by the ITV camera 1 is supplied through a transmission path to a processor unit 3, which executes, for example, a process of calculating a position of the moving object 11. The position calculated by the processor unit 3 is displayed on a screen of a monitor 4.

Figure 4:
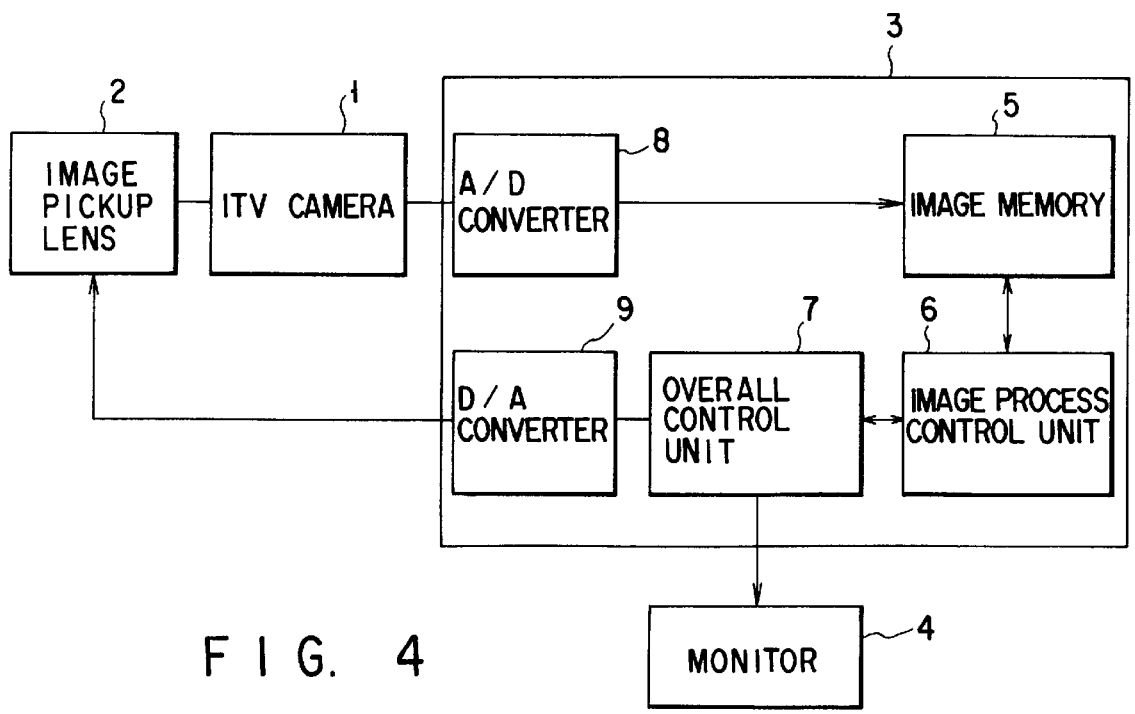
FIG. 4 is a block diagram showing a processing apparatus according to the first embodiment.

The processor unit 3 has a structure, for example, as shown in FIG. 4. The ITV camera 1 consecutively picks up images in the image pickup region and supplies image signals to the processor unit 3. In the processor unit 3, an A/D converter 8 receives an image signal from the ITV camera 1 and analog-to-digital converts it to digital image data, which is stored in an image memory 5. An image process control unit 6 analyzes the content of the image memory 5, thereby measuring a position of the moving object 11. An overall control unit 7 controls an aperture of the image pickup lens 2 of the ITV camera 1. At this time, the processor unit 3 picks up an image, while controlling the aperture of the image pickup lens 2 of the ITV camera 1, so that the position of the moving object 11 can be measured.

In this embodiment, the white line (fixed object) 12 and the tire (moving object) 11 on the road surface 13 are to be recognized. To recognize the white line 12, the aperture of the image pickup lens 2 is narrowed, so that the image is darkened, thereby extracting an image of the white line 12.

To recognize the tire 11, the aperture of the image pickup lens 2 is widened, so that the image can be brightened, thereby extracting an image of the tire 11. The control of the aperture is performed by the image process control unit 6.

Subsequently, the image process control unit 6 receives the two images obtained at the different apertures and adds them together, so that necessary images can be simultaneously extracted from the bright image and the dark image. However, in this embodiment, the positions of the two images may be slightly deviated. In such a case, the images are positioned with reference to a fixed object such as the white line 12, and thereafter the images are added together.

A general operation of the apparatus will be described with reference to the flowchart shown in FIG. 5. In step ST10, the power of the apparatus is turned on and initial setting is performed when the moving object 11 is not present. Then, whether the moving object 11 is present in the image pickup region is determined (ST20). If the moving object 11 is present, a position detecting process is performed (ST30). The position detecting process is continued until the moving object 11 is stopped (ST40) or gone out of the image pickup region.

The initial setting of step ST10 is executed in accordance with the flowchart shown in FIG. 6. At a time of the initial setting, the fixed object 12 is present in the image pickup region but the moving object 11 is not. Therefore, in the initial setting, an image including the fixed object 12 is picked up by the ITV camera 1 (ST11) and an image luminance histogram is calculated (ST12). Thereafter, whether the calculated luminance histogram is proper is determined (ST13). If the luminance histogram is not proper, the aperture of the image pickup lens 2 of the ITV camera 1 is controlled (ST14), and if it becomes proper, the initial setting process is ended.

Figure 8:
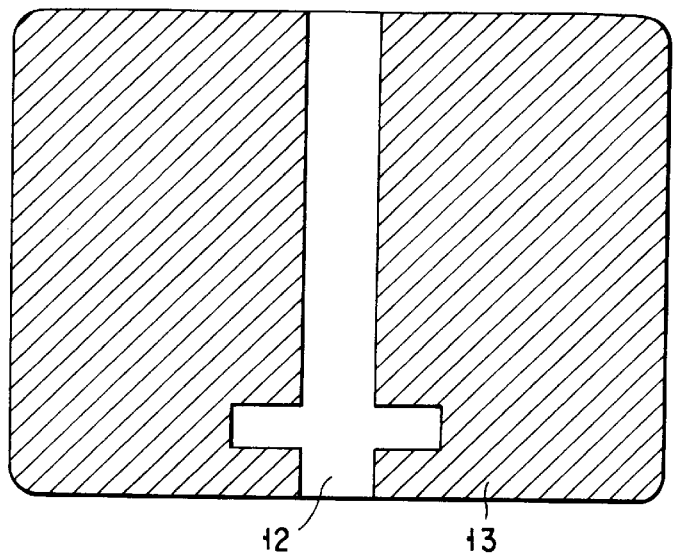
FIG. 8 is a diagram showing an initial image first picked up in initial setting according to the first embodiment.
Figure 9:
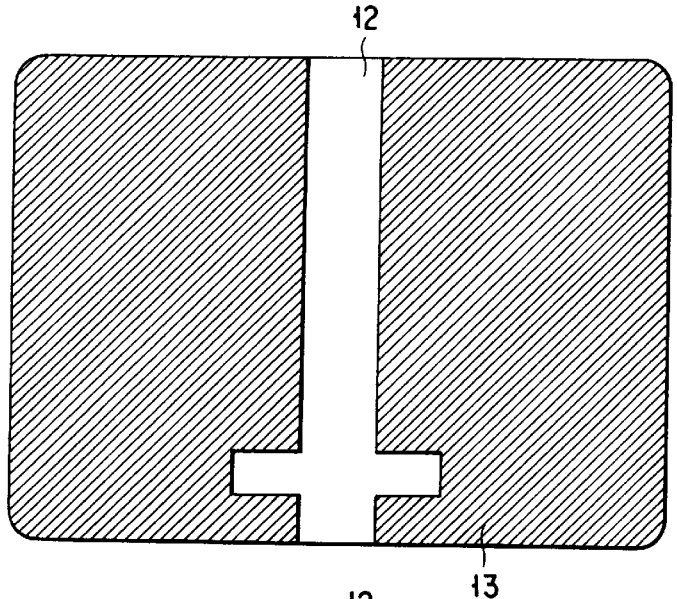
FIG. 9 is a diagram showing the best image picked up in initial setting according to the first embodiment.

As described above, in the initial setting, the image pickup lens 2 is controlled so that the fixed object (white line) 12 can be extracted optimally, i.e., the aperture is set narrower than normal. In a normal aperture state, since the picked-up image is relatively bright as shown in FIG. 8, the difference in luminance between the white line 12 and the road surface 13 is too small to discriminate the white line 12 from the road surface 13. When the aperture is controlled so as to be narrower to accurately recognize the white line 12, the picked-up image becomes dark as shown in FIG. 9. In this state, the difference in luminance between the white line 12 and the road surface 13 is greater, so that the white line 12 and the road surface 13 can easily be discriminated from each other. The initial setting is executed, for example, every hour.

Figure 10:
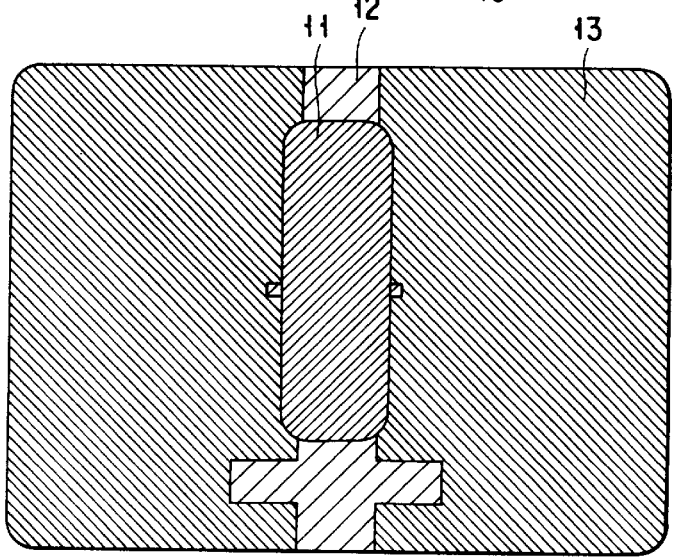
FIG. 10 is a diagram showing an image picked up when the aperture is narrowed in position detection according to the first and second embodiments.
Figure 11:
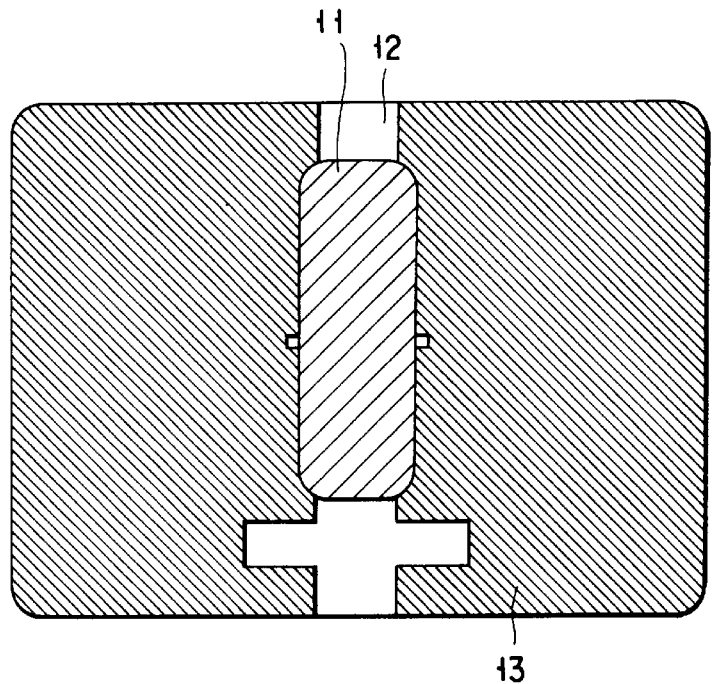
FIG. 11 is a diagram showing an image picked up when the aperture is widened in position detection according to the first and second embodiments.

When the initial setting is completed, an image in the image pickup region is picked up and it is determined whether the moving object 11 is present in the region. If the moving object 11 is present, the position thereof is measured. The position measuring process is executed in accordance with the flowchart shown in FIG. 7. In a state where the aperture is set as narrow as in the initial setting, an image including the moving object in the image pickup region is picked up (ST31). FIG. 10 shows an image picked up in this manner. Since the image is picked up at the narrow aperture, there is little difference in luminance between the road surface 13 and the tire 11 which has a dark and deep color. It is therefore difficult to extract a satisfactory image of the moving object of a deep color, such as the tire 11. To overcome this situation, the aperture of the image pickup lens 2 is widened and an image is picked up (ST32). This time, the image is brighter, so that an object of a deep color can easily be extracted. FIG. 11 shows an image picked up at a widened aperture.

Edges (outlines) of the objects are obtained using both the images shown in FIGS. 10 and 11, thereby obtaining an accurate positional relationship between the moving object 11 and the fixed object 12. More specifically, the white line 12 and the road surface 13 are discriminated from each other in the image shown in FIG. 10 picked up at the narrower aperture, while the tire 11 and the road surface 13 are discriminated from each other in the image shown in FIG. 11 picked up at the widened aperture.

In this embodiment, the images shown in FIGS. 10 and 11 are added together, thereby forming an image (FIG. 12) in which the white line 12, the road surface 13 and the tire 11 are discriminated from one another (ST33). It is necessary that both images be weighted in accordance with the difference in aperture, before the images are added together.

Figure 12:
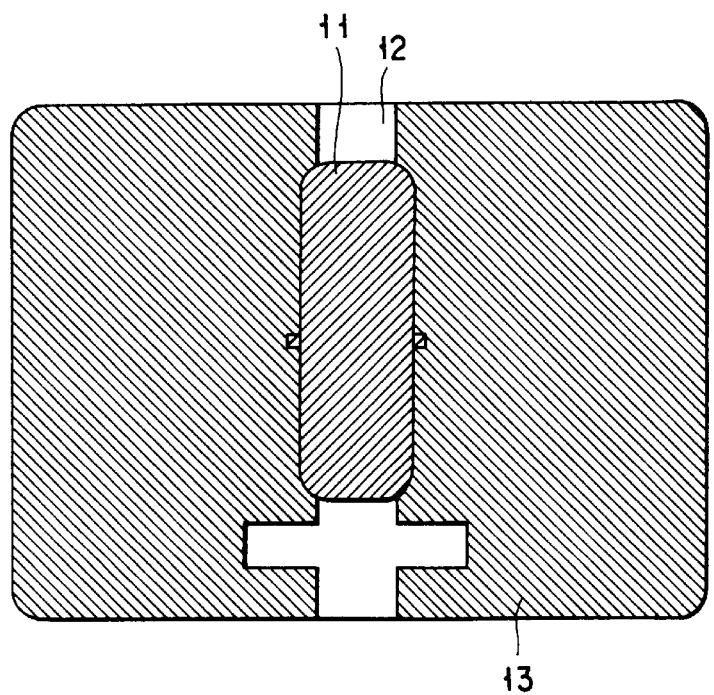
FIG. 12 is a diagram showing an image in which two picked-up images are added together according to the first and second embodiments.
Figure 13A:
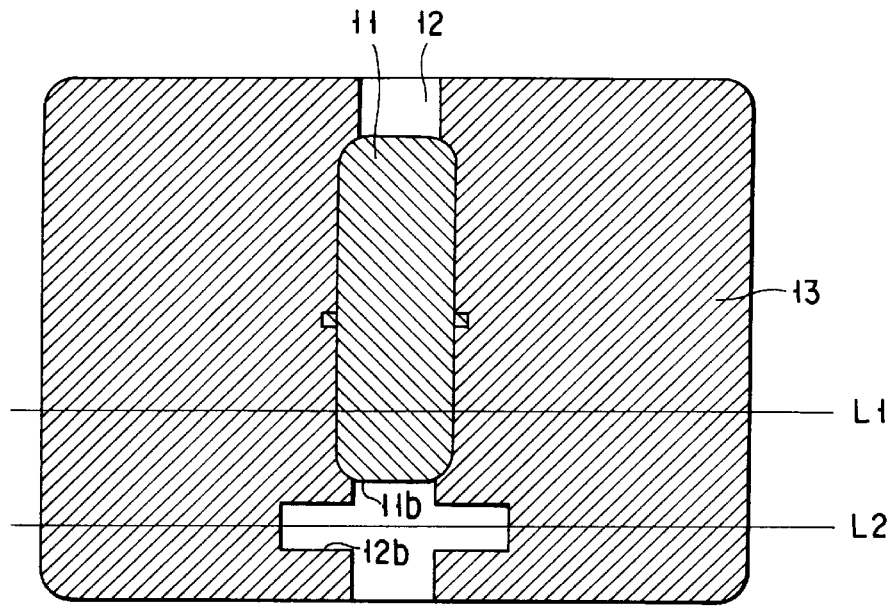
FIGS. 13A to 13E are diagrams for explaining an edge extracting method according to the first and second embodiments.
Figure 13B:
Figure 13C:
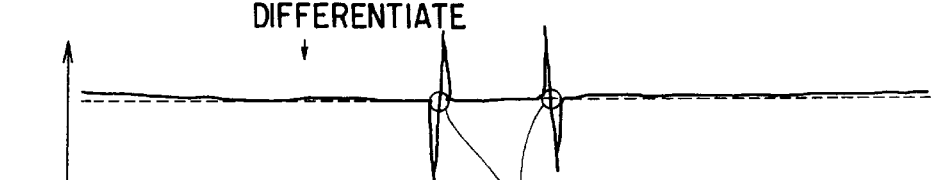
Figure 13D:
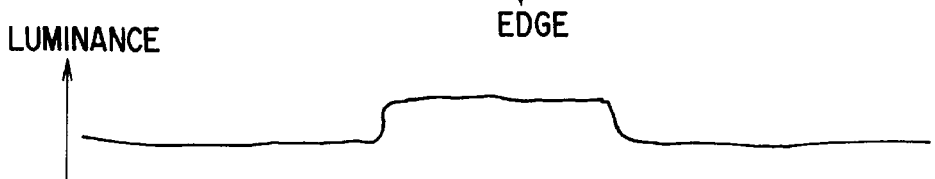
Figure 13E:
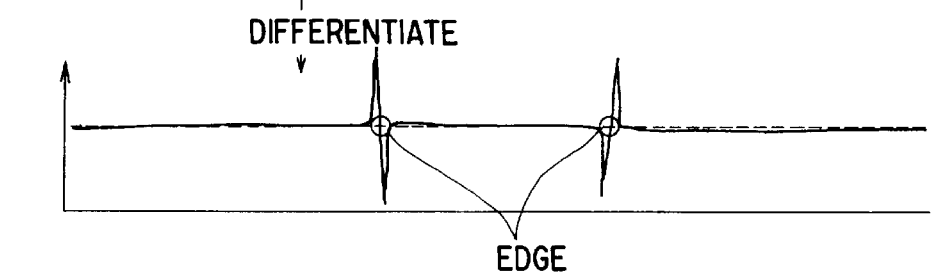

Subsequently, an edge of the added image is extracted (ST34). Various edge extraction methods have conventionally been proposed. In this embodiment, the added image (FIG. 12) is differentiated twice in X and Y directions and a point, at which the differential value is changed as a minimum →0→ maximum or a maximum →0→ a minimum, is detected as an edge. An example of the edge extracting method is shown in FIGS. 13A to 13E. An example of the edge image formed in the above method is shown in FIG. 14. FIG. 13A shows an added image as shown in FIG. 12. FIG. 13B shows a luminance distribution signal along a line L1 of the image shown in FIG. 13A. FIG. 13C shows a signal obtained by differentiating twice the signal shown in FIG. 13B. FIG. 13D shows a luminance distribution signal along a line L2 of the image shown in FIG. 13A. FIG. 13E shows a signal obtained by differentiating twice the signal shown in FIG. 13D.

Then, an edge for use in measurement is recognized from the edge image obtained in the method as described above. For example, a lower edge 11b of the tire 11 and a lower edge 12b of the lower horizontal line (stop line) of the white line 12 are recognized as edges for use in the measurement. The distance between the edges is obtained as the number of pixels (ST35). The number of pixels is converted to an actual distance on the road surface in consideration of the distance between the ITV camera 1 and the target white line, the angle of the ITV camera and the angle of field (ST36).

Figure 16:
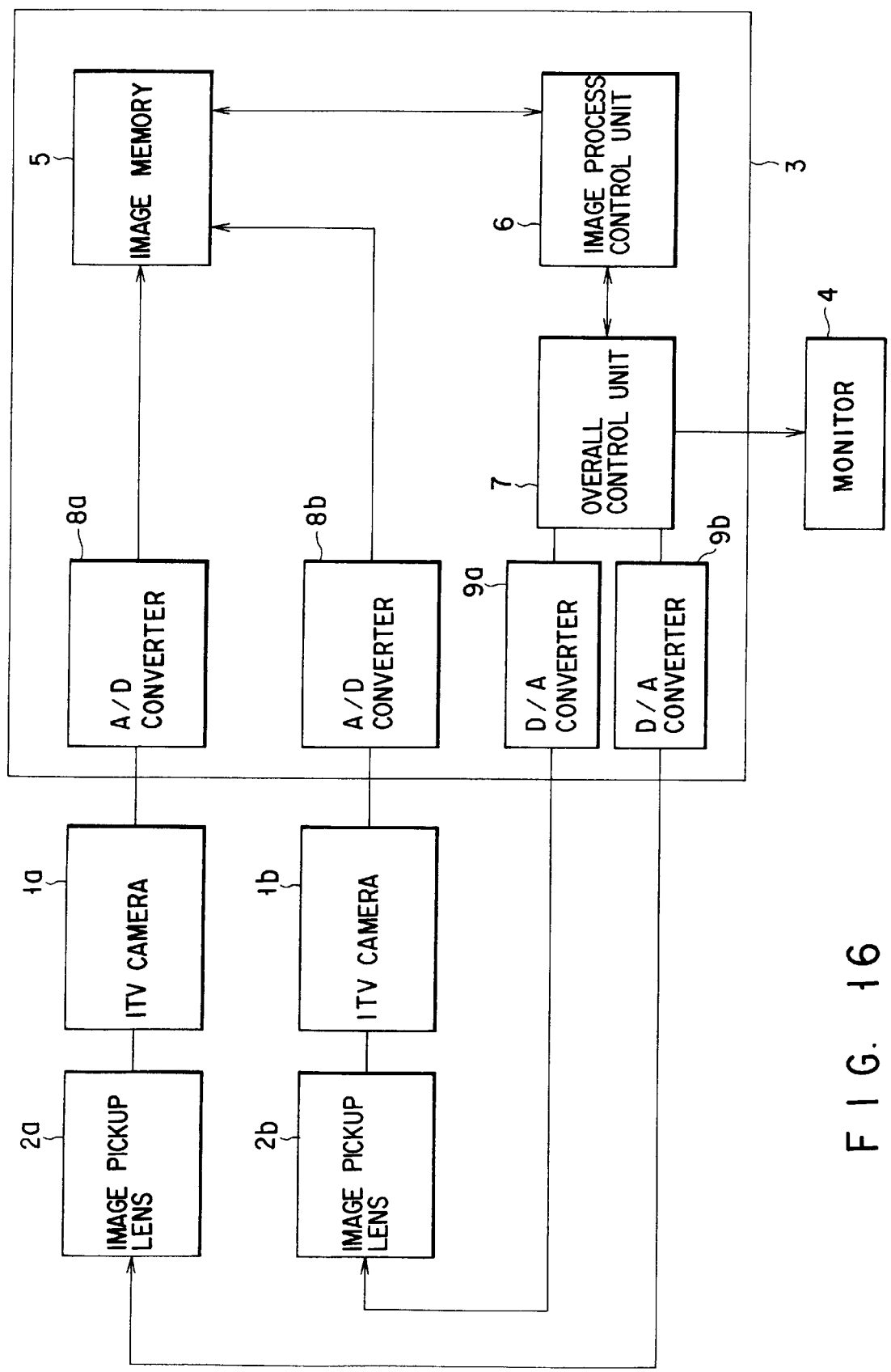
FIG. 16 is a block diagram showing a processor unit according to the second embodiment.

A second embodiment of the present invention will now be described. FIGS. 15 and 16 show a moving object image pickup apparatus according to a second embodiment of the present invention. In FIGS. 15 and 16, the same elements as those in the first embodiment (FIGS. 3 and 4) are identified with the same reference numerals as used in FIGS. 3 and 4.

In the second embodiment, a position of a moving object is detected by two ITV cameras, respectively having image pickup lenses of different apertures. More specifically, ITV cameras 1a and 1b serving as image pickup means respectively comprise image pickup lenses 2a and 2b of aperture-variable type. Optical axes of the image pickup lenses are arranged on the same vertical plane. The ITV cameras 1a and 1b pick up images in an image pickup region including a fixed object (white line) 12 and a moving object (tire) 11 on a road surface 13, and generate electrical signals corresponding to the picked-up images. Image signals corresponding to the images picked up by the ITV cameras 1a and 1b are supplied through a transmission path to a processor unit 3, which executes, for example, a process of calculating a position of the moving object 11. The position calculated by the processor unit 3 is displayed on a screen of a monitor 4.

The processor unit 3 has a structure, for example, as shown in FIG. 16. The ITV cameras 1a and 1b consecutively pick up images in the image pickup region and supply image signals to the processor unit 3. In the processor unit 3, A/D converters 8a and 8b receive the image signals from the ITV cameras 1a and 1b and analog-to-digital convert them to digital image data, which are stored in an image memory 5. An image process control unit 6 analyzes a content of the image memory 5, thereby measuring a position of the moving object 11. An overall control unit 7 controls apertures of the image pickup lenses 2a and 2b of the ITV cameras 1a and 1b.

In this embodiment also, the white line 12 and the tire 11 on the road surface 13 are recognized. To recognize the white line 12, a dark image picked up by a camera having an image pickup lens of a narrower aperture (e.g., the ITV camera 1b) is used. To recognize the tire 11, a bright image picked up by a camera having an image pickup lens of a wider aperture (e.g., the ITV camera 1a) is used. The control is performed by the image process control unit 6.

Thereafter, the image process control unit 6 adds the images picked up by the cameras, so that necessary information can be extracted simultaneously from the bright image and the dark image. Although there is a slight error between the two images due to the parallax of the ITV cameras 1a and 1b, the images are positioned with reference to a fixed object such as the white line 12, thereby compensating for the parallax of the cameras.

A general operation of the apparatus of this embodiment is similar to that of the first embodiment as shown in the flowchart of FIG. 5 and a description thereof will be omitted. However, an initial setting process (ST10) and a position detecting process (ST30) for detecting a position of the moving body are different from those of the first embodiment.

Figure 20:
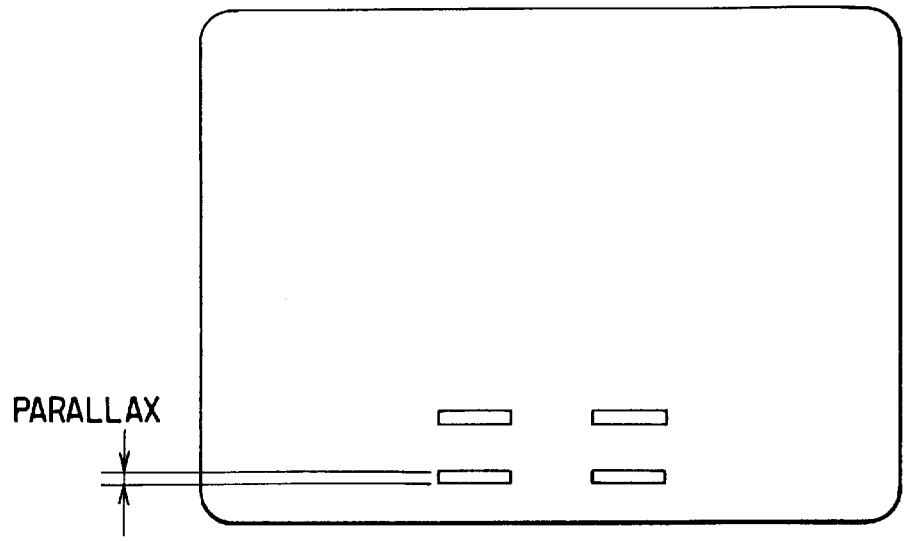
FIG. 20 is a diagram showing a parallax image obtained in the second embodiment.
Figure 21:
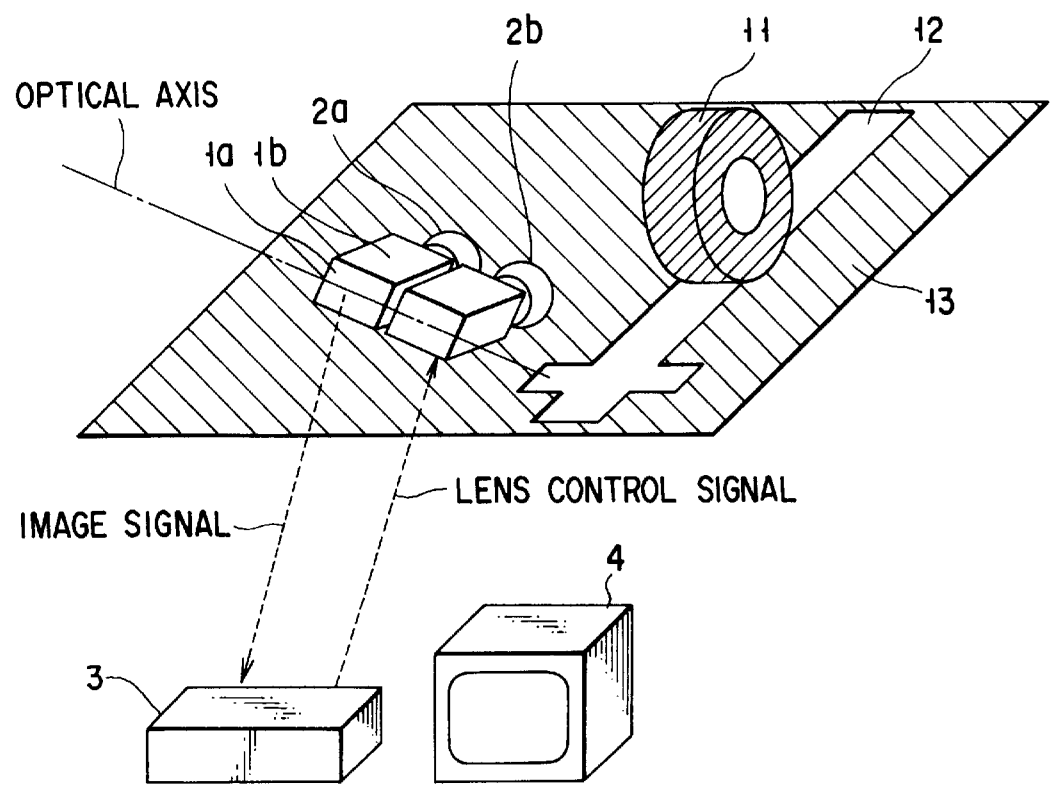
FIG. 21 is a schematic diagram showing a modification of the moving object image pickup apparatus according to the second embodiment.

The initial setting of the second embodiment is executed in accordance with the flowchart shown in FIG. 17. At the time of the initial setting, the fixed object 12 is present in the image pickup region but the moving object 11 is not. Therefore, in the initial setting, the apertures of the image pickup lenses 2a and 2b of the ITV cameras 1a and 1b are set the same (ST11'), and images including the fixed object 12 are picked up (ST12') and the parallax of the ITV cameras 1a and 1b is recognized (ST13'). The image picked up by the ITV camera 1a is indicated by the solid line in FIG. 19, whereas the image picked up by the other ITV camera 1b is indicated by the broken line in FIG. 19. When one of the images is subtracted from the other, the parallax of the two ITV cameras 1a and 1b, as shown in FIG. 20, can be obtained.

Subsequently, for example, the aperture of the image pickup lens 2a of the ITV camera 1a is widened, while the aperture of the image pickup lens 2b of the other ITV camera 1b is narrowed (ST14').

When the initial setting is completed, an image in the image pickup region is picked up and it is determined whether the moving object 11 is present in the region. If the moving object 11 is present, the position thereof is measured. The position measuring process is executed in accordance with the flowchart shown in FIG. 18. When the moving object enters the image pickup region, images including the moving object are picked up by the ITV camera 1b having the narrower aperture and the ITV camera 1a having the wider aperture (ST31'). FIG. 10 shows an image picked up by the ITV camera 1b. Since the image is picked up at the narrower aperture, the white line 12 is clear but the outline of the moving object (i.e., the tire 11) having a dark color is unclear and cannot easily be extracted. On the other hand, the image (as shown in FIG. 11) picked up by the ITV camera 1a is bright and the object 11 of the deep color can easily be extracted. In other words, the white line 12 and the road surface 13 can be discriminated from each other in the image picked up by the ITV camera 1b of the narrower aperture (FIG. 10), while the tire 11 and the road surface 13 can be discriminated from each other in the image picked up by the ITV camera 1a of the wider aperture (FIG. 11).

Edges of the objects are obtained using both the images shown in FIGS. 10 and 11, thereby obtaining the accurate positional relationship between the moving object 11 and the fixed object 12.

In this embodiment also, the images shown in FIGS. 10 and 11 are added together, thereby forming an image (FIG. 12) in which the white line 12, the road surface 13 and the tire 11 are discriminated from one another. Also, in this case, it is necessary that both images be weighted in accordance with the difference in aperture, before the images are added together. Further, the images are shifted by the amount of the parallax, so that the parallax obtained in the initial setting can be compensated, before the images are added.

Thereafter, an edge of the added image is extracted (ST33'), a distance between edges is measured (ST34') and the distance is converted to an actual distance (ST35'). These processes are the same as those in the first embodiment, and therefore the detailed descriptions thereof will be omitted.

In the second embodiment, the ITV cameras 1a and 1b are arranged one above the other in a vertical direction, so that the optical axes thereof are located on the same vertical plane. In this arrangement, since the parallax of the ITV cameras 1a and 1b in a horizontal direction is "0", there is substantially no error in edge detection in the horizontal direction. Therefore, the position of the moving object in the horizontal direction can be detected accurately. If an accuracy of the position in the fore and aft direction is required, the ITV camera 1a and b are arranged side by side in the horizontal direction, so that the optical axes thereof are located on the same horizontal plane. In this case, images obtained in the initial setting by the ITV cameras 1a and b are as shown in FIG. 22, and a parallax image obtained by the initial setting is as shown in FIG. 23.

The ITV camera used in the first and second embodiments is of the type in which the aperture of an image pickup lens is variable. In a type of ITV camera, an image signal gain can be varied in cases of picking up an image of a bright object and a dark object. In this type of ITV camera, the gain can be varied, so that a dark image can be brightened or a bright image can be darkened.

Figure 25:
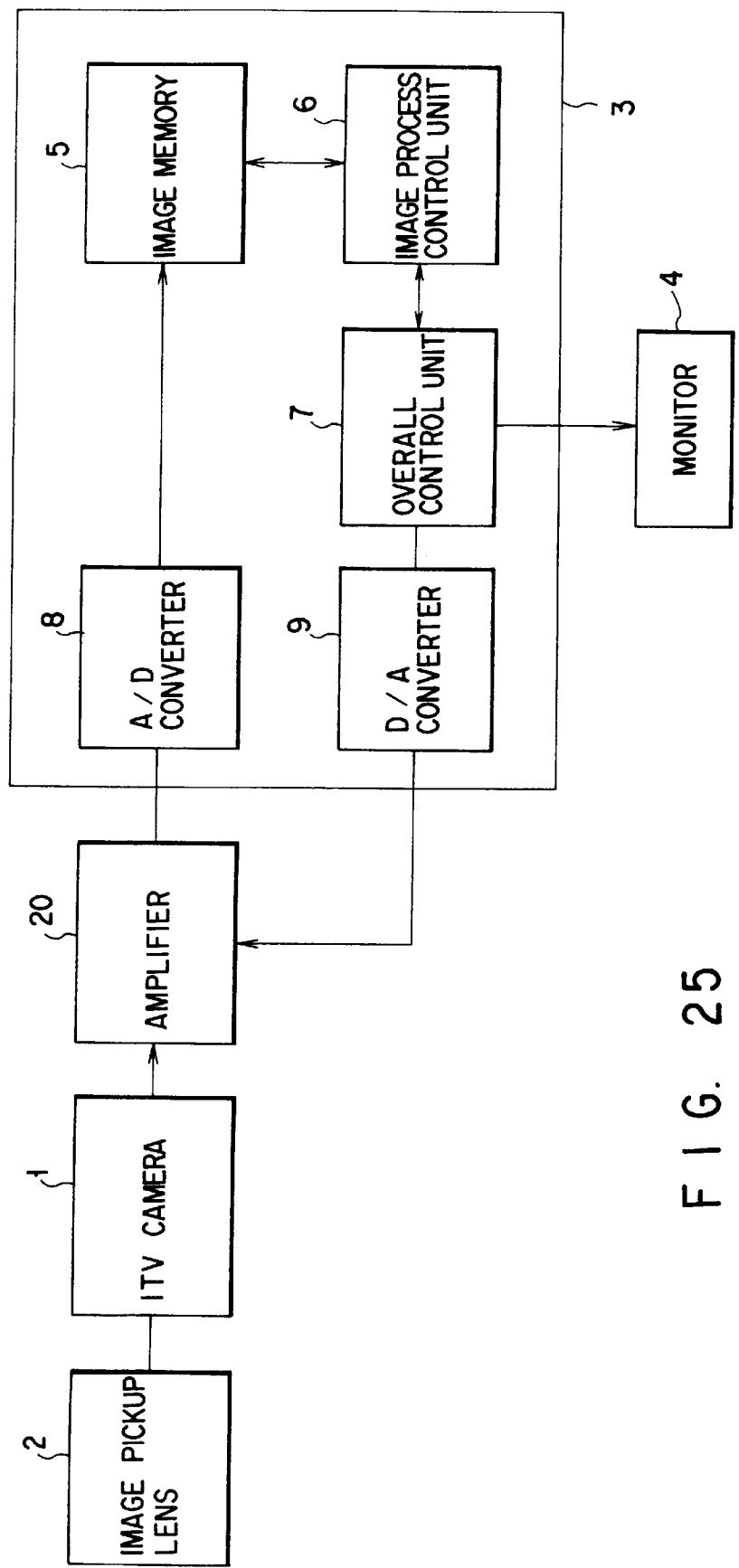
FIG. 25 is a block diagram showing a processing apparatus according to the third embodiment.

In a third embodiment, the gain of such an ITV camera is varied, thereby obtaining the same effect as that in a case where an optical aperture is changed. FIGS. 24 and 25 show the third embodiment of the present invention, in which a single ITV camera is used as in the first embodiment. A variable amplifier 20 for amplifying an image signal output from the ITV camera 1 is arranged outside the ITV camera 1. The gain of the amplifier 20 is controlled by a processor unit 3, as the aperture is controlled in the first and second embodiments.

FIGS. 26 and 27 show a fourth embodiment of the present invention. In this embodiment, two ITV cameras 1a and b are used as in the second embodiment. Gains of amplifiers 20a and 20b are controlled by a processor unit 3. It is self-explanatory that the variable amplifiers can be incorporated in the ITV cameras, to obtain the same effect as in the first to third embodiments.

A fifth embodiment of the present invention will now be described. In this embodiment, the present invention is applied to an image pickup apparatus for clearly picking up an image of a moving object alone.

FIG. 28 shows an appearance of an object image pickup apparatus according to the fifth embodiment of the present invention. The appearance is similar to that shown in FIG. 1, except that a monitor 4 is not provided and a moving object (i.e., an object whose image is to be picked up) is not a tire 11 but the automobile in its entirety. An ITV camera 1 picks up an image of an image pickup region including an automobile (moving object) 21 running on a road surface 13. An image signal corresponding to the image picked up by the ITV camera 1 is supplied through a transmission path to a processor unit 3', which controls an image pickup lens 2 so that an image of the moving object 21 can be optimally picked up.

FIG. 29 is a block diagram showing a structure of the processor unit 3'. The structure is substantially the same as that of the first embodiment shown in FIG. 4, except that an image process unit 16 includes an A/D converter 8, an image memory 5 and a processor 15, and a lens control unit 18 includes a D/A converter 9 and a processor 17. The processor 15 of the image process unit 16 analyzes a content of the image memory 5 and supplies the analysis result to the processor 17 of the lens control unit 18. The processor 17 supplies a control signal to the image pickup lens 2 through the D/A converter 9 so as to control the enlargement ratio, aperture and focal length of the image pickup lens 2.

In the fifth embodiment, images picked up by the ITV camera 1 are successively A/D converted to digital data, which are sequentially stored in the image memory 5. An optimal image is selected from the images stored in the memory, the aperture at which the optimal image is picked up is determined, and the aperture of the image pickup lens 2 is set to the optimal aperture.

As described above, in order to obtain an accurate image of the moving object 21 on the road surface 13, the contrast between the image of the moving object 21 and the road surface must be as great as possible and the image of the moving object 21 must not be saturated. For this reason, a series of images are fetched, while the aperture of the image pickup lens is changed from the initial aperture to the final aperture during a period of time T. The series of images are analyzed to select an optimal image of the moving object 21.

An aperture control operation will be described in detail with reference to the flowchart shown in FIG. 30. When the control operation is started, the processor 15 supplies to the processor 17 a command for setting the image pickup lens 2 to an initial aperture (ST50). When the image pickup lens 2 is set to the initial aperture (ST51), the processor 15 supplies to the processor 17 a command for setting the image pickup lens 2 to a final aperture (ST52). Immediately thereafter, the processor 15 causes the A/D converter 8 to A/D convert input images at regular time intervals or at a plurality of suitable timings, so as to store a plurality of continuous images in the image memory 5 (ST53). In general, each of the periods, at which the images are fetched, is as short as a fraction of the period of time in which the image pickup lens 2 is changed from the initial aperture to the final aperture. Alternatively, the image fetching timing may be controlled by a sync signal output from the lens control unit 18 to the image process unit 16.

Figure 31:
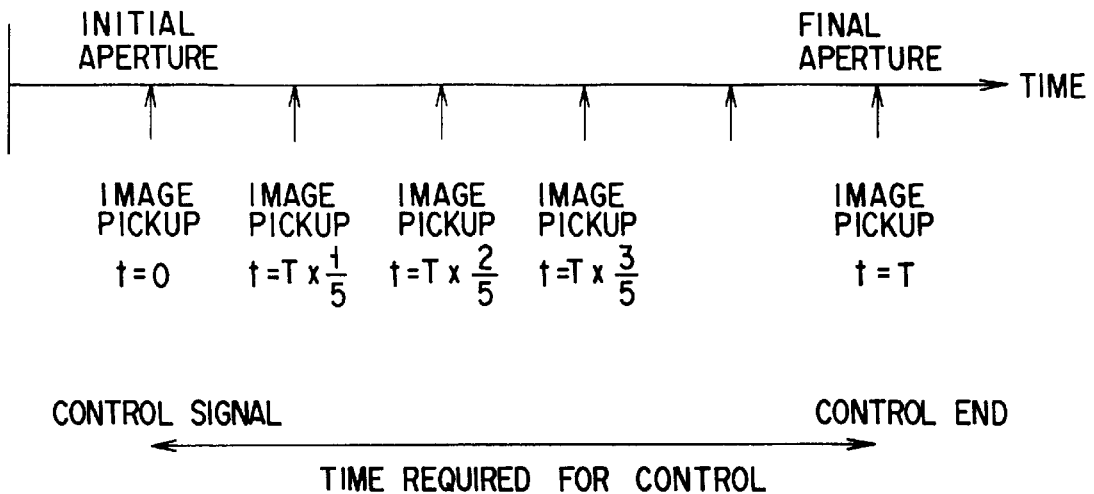
FIG. 31 is a timing chart showing an image pickup operation in aperture control according to the fifth embodiment.
Figure 32:
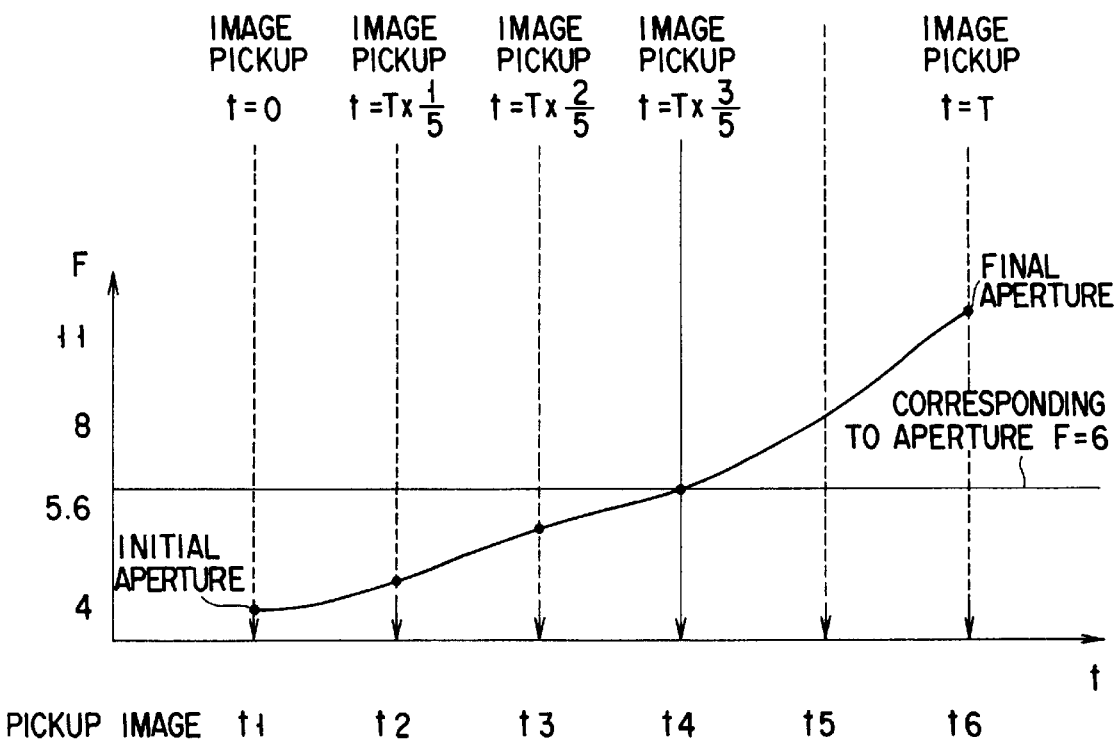
FIG. 32 is a diagram showing the relationship between an image pickup timing and an aperture in aperture control according to the fifth embodiment.

FIG. 31 is a timing chart showing an image fetching operation in aperture control. FIG. 32 shows the relationship between an image fetching timing and an aperture. The images fetched in the control are shown in FIGS. 33 to 35. FIG. 33 shows examples of images fetched at an initial aperture (at $t_1$) and a final aperture (at $t_6$). FIGS. 34 and 35 show examples of images fetched between $t_1$ and $t_6$, i.e., at $t_2$ to $t_5$.

Referring back to the flowchart, an optimal input image is selected from the series of images continuously input (ST55). In this embodiment, an image having an optimal luminance distribution of the moving object 21 in the image pickup region 10 is selected. More specifically, an image, in which a luminance of the greatest frequency is located in a middle portion or within a preset range of the histogram, is determined to be an optimal image. FIG. 36 shows luminance histograms with respect to the series of images shown in FIGS. 33 to 35. It is understood from the luminance histograms that an image obtained at $t_4$ is the optimal image. A control value (optimal aperture) of the image pickup lens 2 is obtained on the basis of time data at the time ($t_4$) when the optimal image is picked up. According to FIG. 32, it is understood that an image of the optimal aperture is obtained at an aperture F=6. Therefore, in this case, the lens control unit 18 controls the image pickup lens 2 to the aperture F=6.

According to the present invention, an image of an optimal aperture can be automatically obtained within a short period of time. Therefore, the operator need not set an optimal value of the aperture as in the conventional art.

The fifth embodiment can be applied to the first embodiment. FIG. 37 is a flowchart showing an operation of a sixth embodiment of the present invention, obtained by applying the fifth embodiment to the first embodiment. In the sixth embodiment, the technique according to the fifth embodiment is applied to the step ST32 of the distance measuring process of the first embodiment as shown in FIG. 7. In FIG. 37, a step of the same content as that shown in FIG. 7 is assigned the same step number as used in FIG. 7. The step ST32 in FIG. 7 corresponds to steps ST60 to ST63 in FIG. 37. More specifically, in the first embodiment, when the moving object 11 enters the image pickup region, an image is fetched at a narrow aperture (ST31) and then the aperture of the image pickup lens 2 is widened to a suitable value determined by the operator in advance to pick up an image of the moving object 11 (ST32). However, in the sixth embodiment, after the step ST31, while the lens 2 is controlled toward the final aperture (ST60), images are fetched at regular time intervals (ST61), and the optimal image and aperture are selected (ST63). An edge of the moving object 11 is detected using the optimal image. The optimal aperture is judged, for example, every hour. The "optimal aperture" thus selected is used in the subsequent tire image fetching process as "the widened aperture" in the step ST32 for fetching an image with a widened aperture in the first embodiment.

A seventh embodiment of the present invention will now be described.

In the seventh embodiment, while the enlargement ratio of an image pickup lens 2 mounted on an ITV camera 1 is changed, images of a moving object are fetched at a plurality of different enlargement ratios and stored in an image memory 5. The best image is selected from the stored images. At the same time, an optimal enlargement ratio to pick up an image of the target moving object 21 is obtained to control the image pickup lens 2 to the optimal enlargement ratio.

In general, to obtain an accurate image of the moving object 21 on the road surface 13, the image of the moving object 21 must be enlarged as large as possible, while even a part of the moving object 21 must not be missing. Therefore, a series of images of different enlargement ratios are successively fetched during a time period t in which the image pickup lens 2 is operated from the initial enlargement ratio to the final enlargement ratio. The series of images are analyzed and an image optimally showing the moving object 21 is selected from the analyzed images.

An operation of the seventh embodiment will be described in detail with reference to the flowchart shown in FIG. 38. When the moving object (automobile) 21 enters the image pickup region 10, a processor 15 supplies to a processor 17 a command for setting the image pickup lens 2 to an initial enlargement ratio (a smaller enlargement ratio) (ST70). When the image pickup lens 2 is set to the initial enlargement ratio (ST71), the processor 15 supplies to the processor 17 a command for setting the image pickup lens 2 to a final enlargement ratio (ST72). Immediately thereafter, the processor 15 causes an A/D converter 8 to A/D convert input images at regular time intervals or at a plurality of suitable timings. The converted images are stored in an image memory 5, thereby fetching a plurality of continuous images of different enlargement ratios. In general, each of the periods, at which the images are fetched, is as short as a fraction of the period of time (in general, about 1 second) in which the image pickup lens 2 is changed from the initial enlargement ratio to the final enlargement ratio. Alternatively, the image fetching timing may be controlled by a sync signal output from a lens control unit 18 to an image process unit 16.

Figure 39:
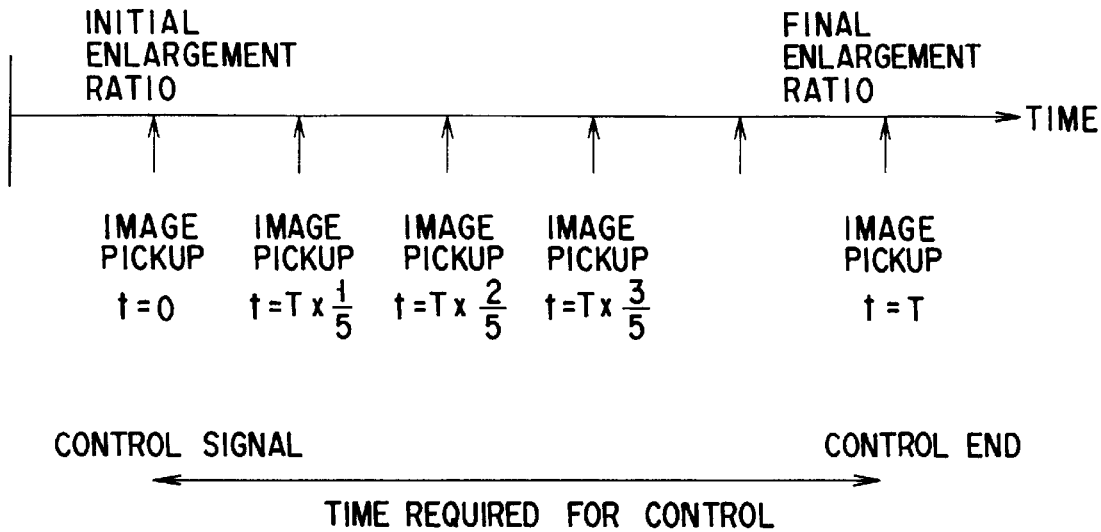
FIG. 39 is a timing chart showing an image pickup operation in enlargement ratio control according to the seventh embodiment.
Figure 40:
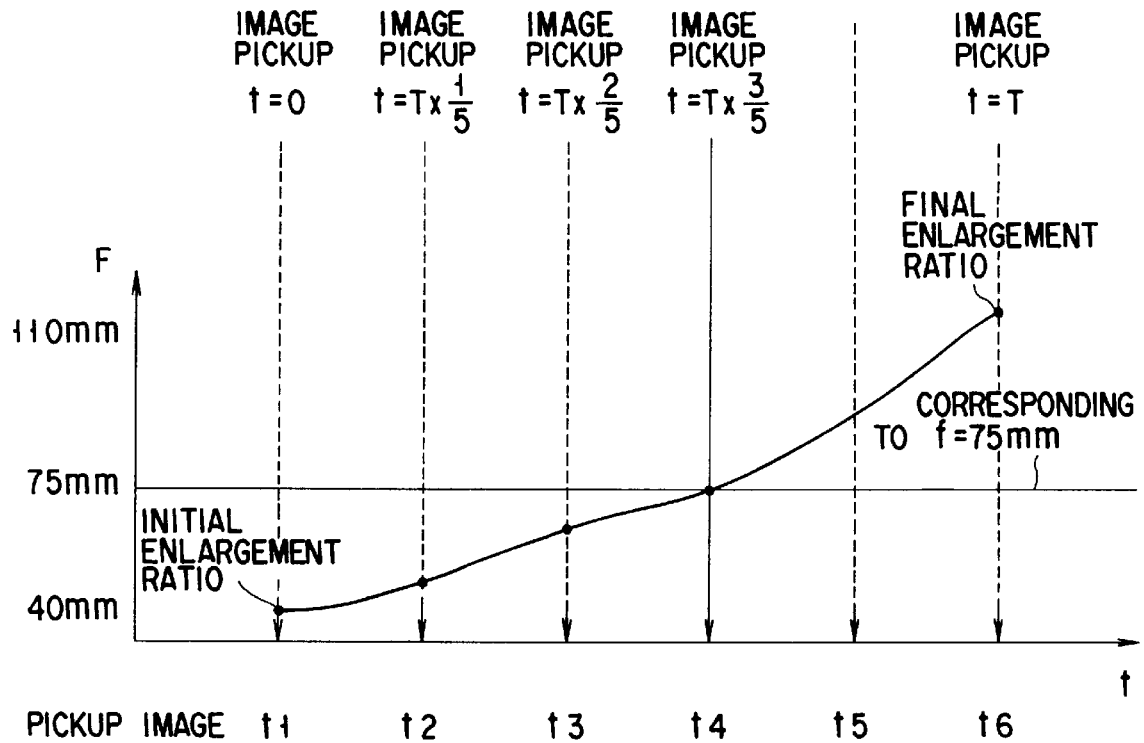
FIG. 40 is a diagram showing the relationship between an image pickup timing and a enlargement ratio in enlargement ratio control according to the seventh embodiment.
Figures 41, 42:
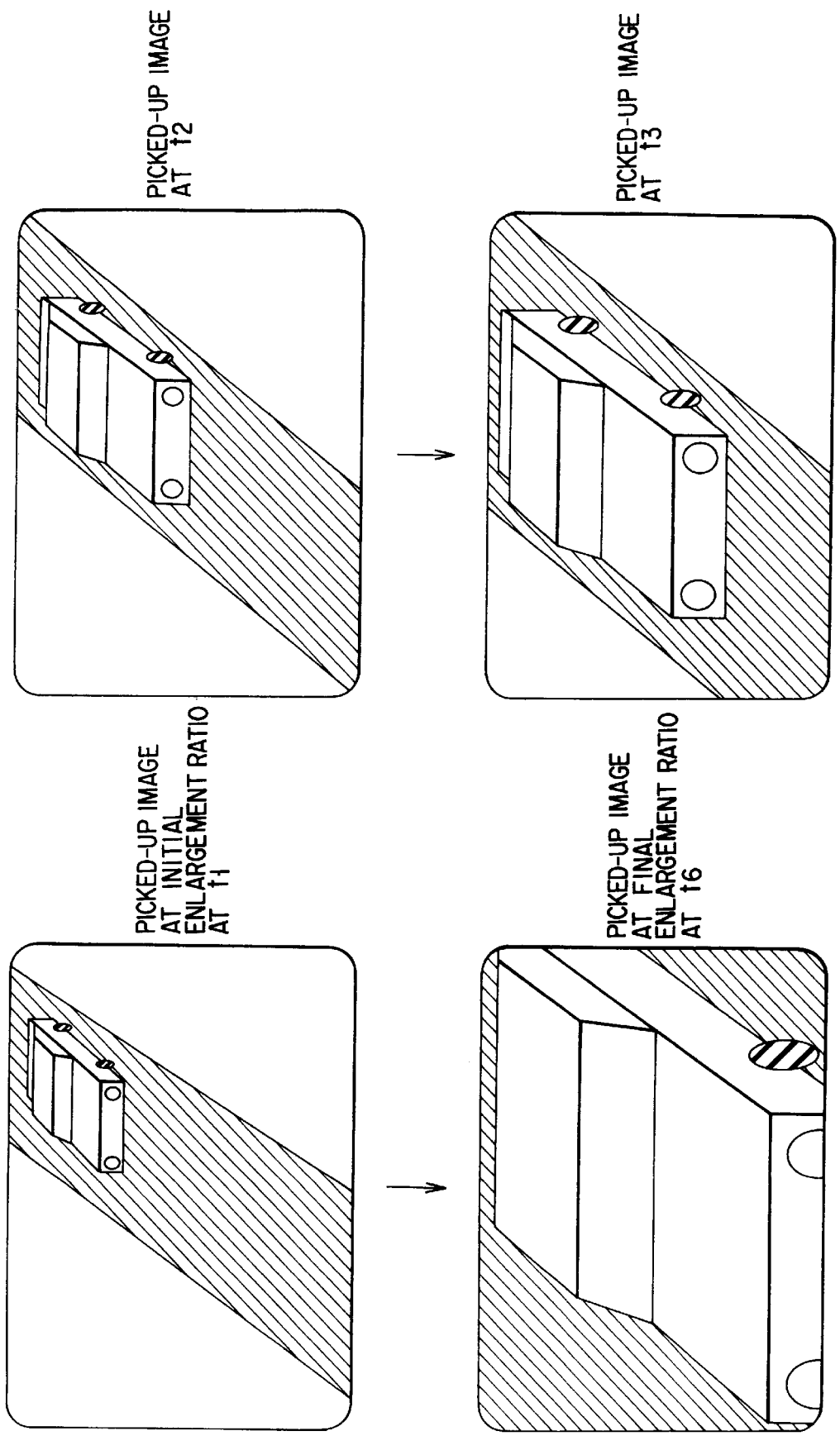
FIG. 41 is a diagram showing examples of images picked up at an initial enlargement ratio and a final enlargement ratio according to the seventh embodiment.
FIG. 42 is a diagram showing examples of images picked up at enlargement ratios between the initial and final enlargement ratios according to the seventh embodiment.
Figure 43:
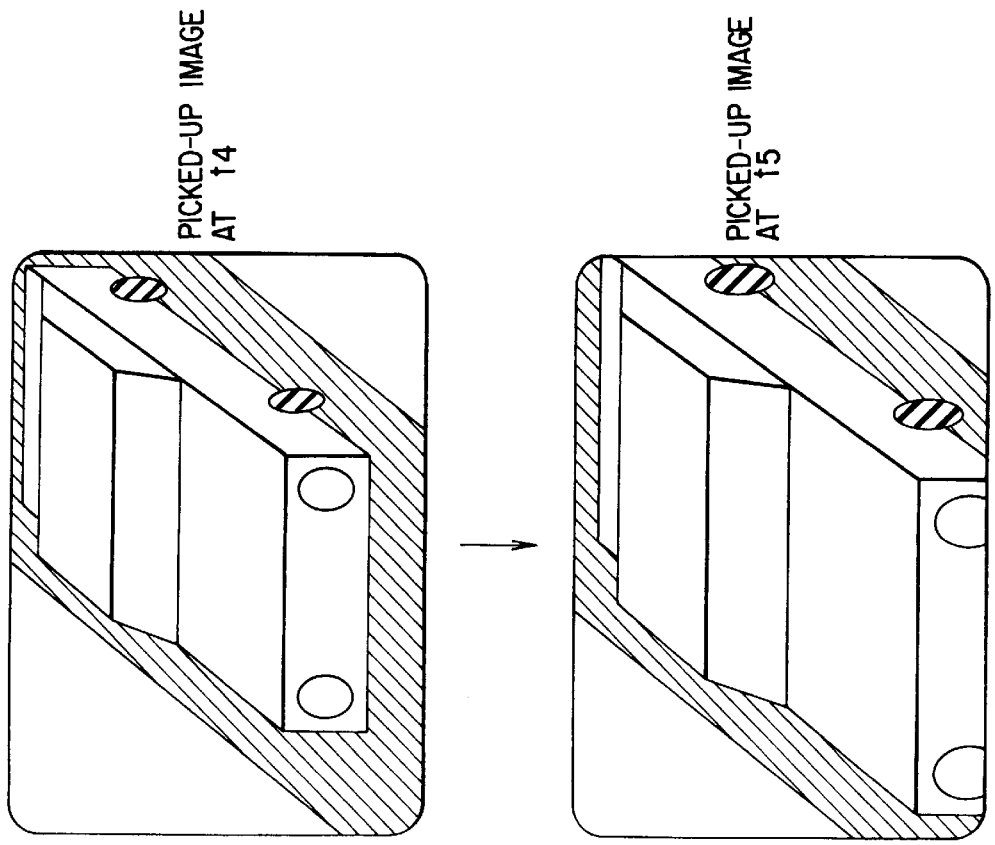
FIG. 43 is a diagram showing examples of images picked up at enlargement ratios between the initial and final enlargement ratios according to the seventh embodiment.

FIG. 39 is a timing chart showing an image fetching operation in enlargement ratio control. FIG. 40 shows the relationship between an image fetching timing and an enlargement ratio. The images fetched in the control are shown in FIGS. 41 to 43. FIG. 41 shows examples of images fetched at an initial enlargement ratio (at $t_1$) and a final enlargement ratio (at $t_6$). FIGS. 42 and 43 show examples of images fetched between $t_1$ and $t_6$, i.e., at $t_2$ to $t_5$.

Figure 44:
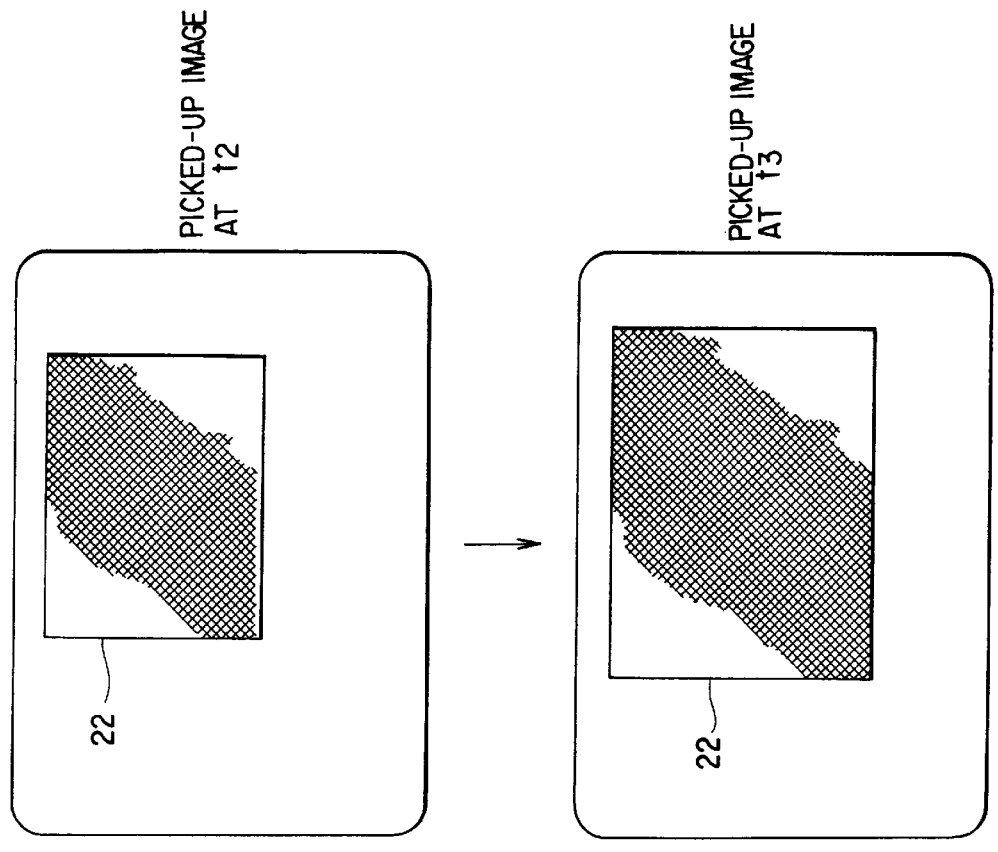
FIG. 44 is a diagram showing a cut-off image of a moving object according to the seventh embodiment.
Figure 45:
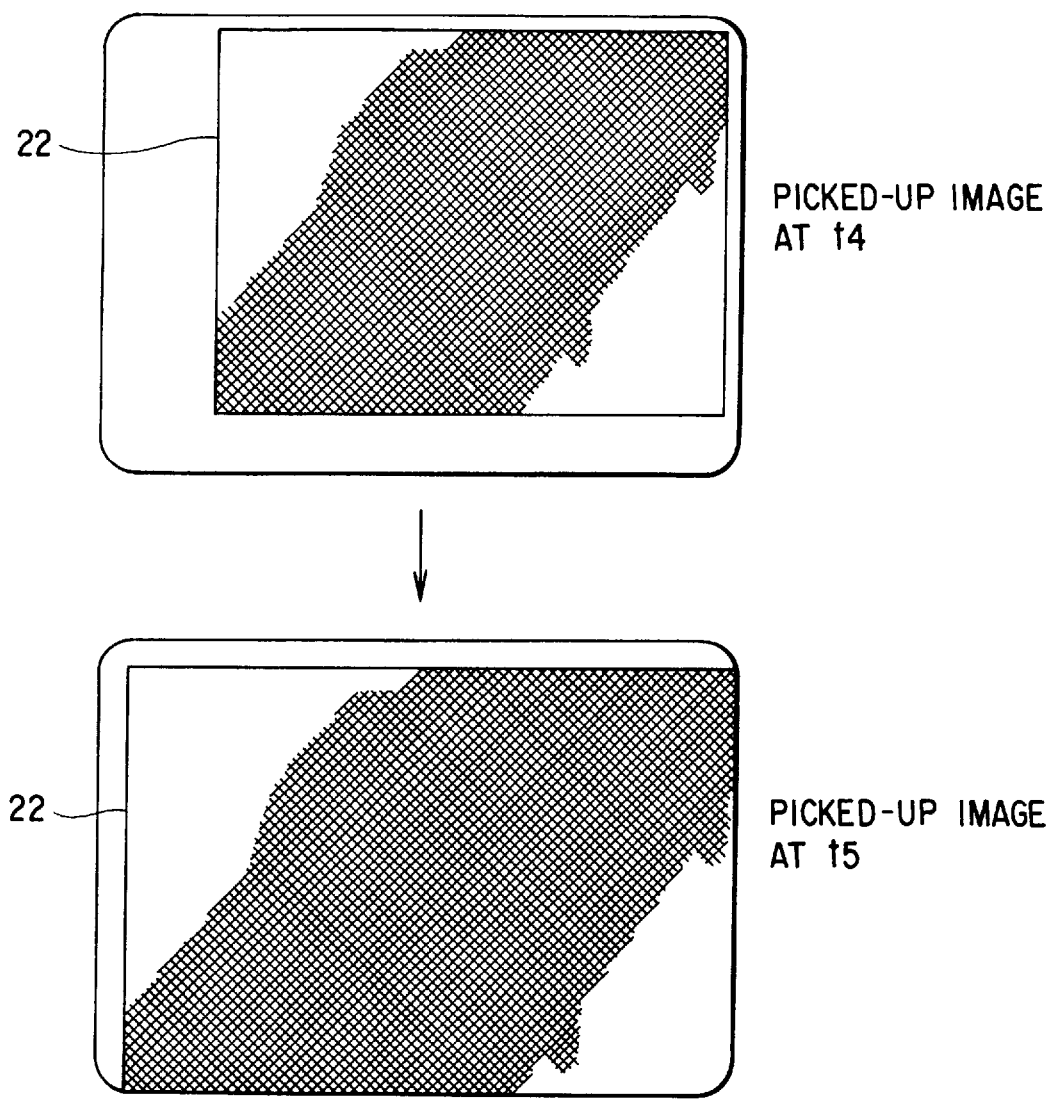
FIG. 45 is a diagram showing a cut-off image of a moving object according to the seventh embodiment.

Subsequently, an optimal input image is selected from the series of images continuously input. In this embodiment, an image including the overall image of the moving object 21, as large as possible in the image pickup region 10, is selected and determined to be an optimal image. FIGS. 44 and 45 show images of the moving object 21 cut off from the fetched images. In view of circumscribed rectangles 22, it is understood that an image obtained at $t_4$ is the optimal image.

In this embodiment, the image of the target moving object 21 is cut off from each of the fetched images and circumscribed rectangles 22 for the respective images are then obtained. Of the circumscribed rectangles 22, the greatest rectangle which includes the overall image of the moving object 21 is selected and determined to be an image of the optimal enlargement ratio. A control value (optimal enlargement ratio) of the image pickup lens 2 is obtained based on the sequence ($t_4$ in this case), i.e., the time data, of the selected optimal image (ST75). According to FIG. 40, it is understood that an image of the optimal enlargement ratio is obtained at an enlargement ratio f=75 mm. Therefore, in this case, the lens control unit 18 controls the image pickup lens 2 to the enlargement ratio f=75. The subsequent image pickup processes are performed with this enlargement ratio.

In the above description, the image of the optimal enlargement ratio is selected by using the circumscribed rectangles obtained from the cutoff images of the moving object 21. However, it is possible that areas of the respective images of the moving object 21 cut off from the fetched images are obtained and an image of an area within a predetermined threshold range is select as an optimal image.

According to the present invention, an image of an optimal enlargement ratio can be automatically obtained within a short period of time. Therefore, the operator need not set an optimal value of the enlargement ratio as in the conventional art.

An eighth embodiment of the present invention will be described.

In the eighth embodiment, while the focal length of an image pickup lens 2 mounted on an ITV camera 1 is changed, images of a moving object are fetched at a plurality of different focal lengths and stored in an image memory 5. The best image is selected from the stored images. At the same time, an optimal focal length to fetch an image of the target moving object 21 is obtained to control the image pickup lens 2 to the optimal focal length.

In general, to obtain an accurate image of the moving object 21 on the road surface 13, the image of the moving object 21 must be focused as accurately as possible. Therefore, a series of images of different focal lengths are successively fetched during a time period t in which an initial focal length is changed toward a final focal length. The series of images are analyzed and an image optimally showing the moving object 21 is selected from the analyzed images.

An operation of the eighth embodiment will be described in detail with reference to the flowchart shown in FIG. 46. When the moving object (automobile) 21 enters an image pickup region 10, a processor 15 supplies to a processor 17 a command for setting the image pickup lens 2 to an initial focal length (ST80). When the image pickup lens 2 is set to the initial focal length (ST81), the processor 15 supplies to the processor 17 a command for setting the image pickup lens 2 to a final focal length (ST82). At the same time, the processor 15 causes an A/D converter 8 to A/D convert input images at regular time intervals or at a plurality of suitable timings. The converted images are stored in an image memory 5, thereby fetching a plurality of continuous images (ST83).

In general, each of the periods, at which the images are fetched, is as short as a fraction of the period of time in which the image pickup lens 2 is changed from the initial focal length to the final focal length. Alternatively, the image fetching timing may be controlled by a sync signal output from a lens control unit 18 to an image process unit 16.

Figure 47:
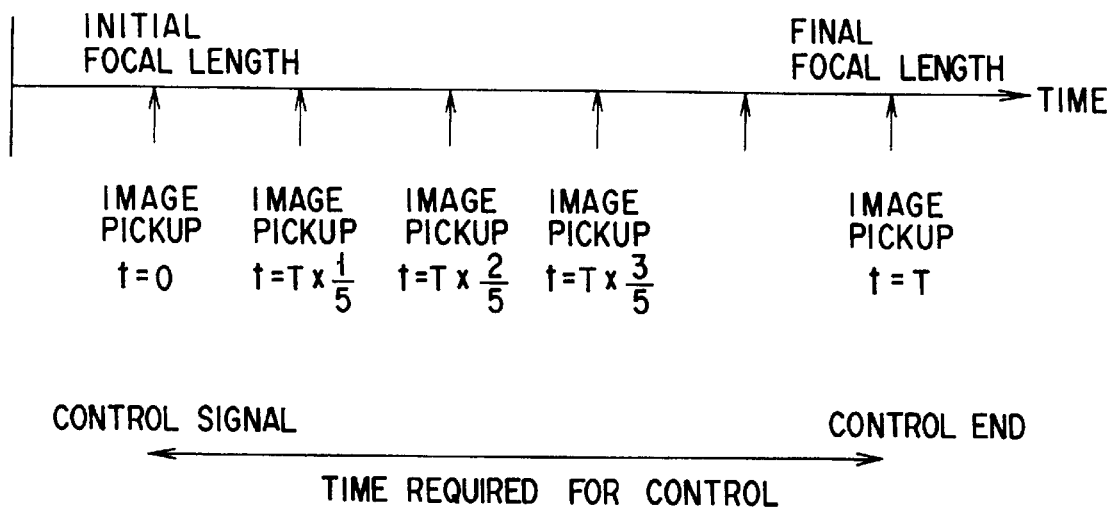
FIG. 47 is a timing chart showing an image pickup operation in focal length control according to the eighth embodiment.
Figure 48:
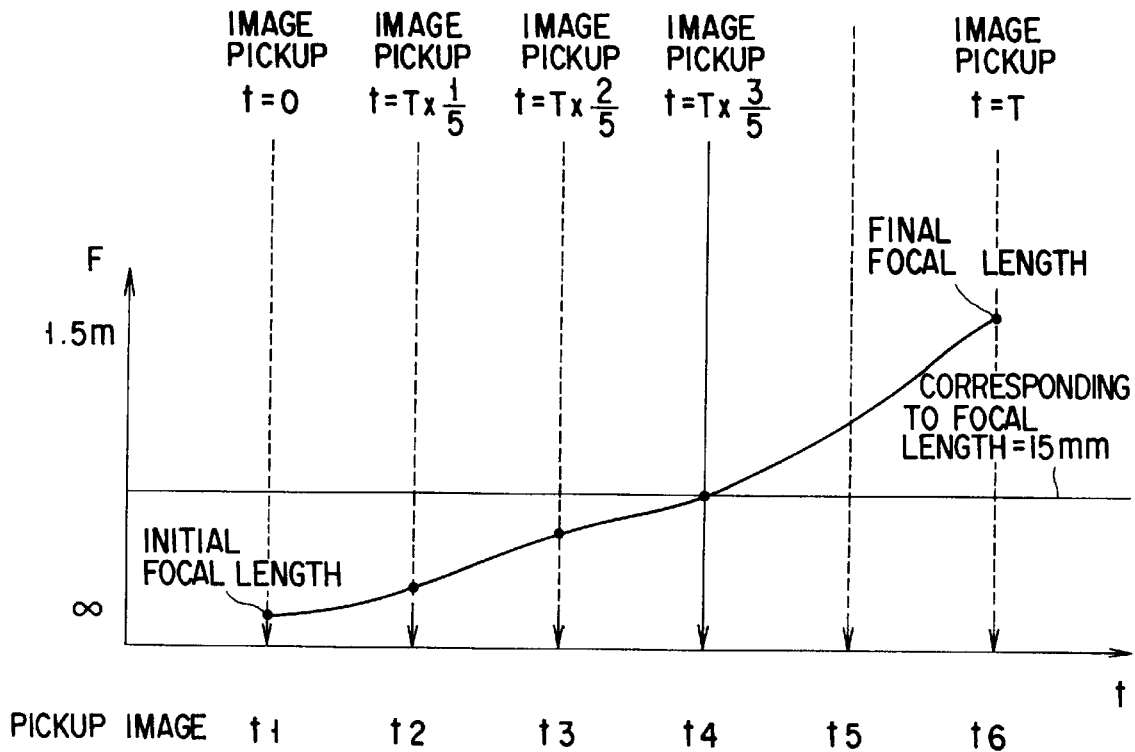
FIG. 48 is a diagram showing the relationship between an image pickup timing and a focal length in focal length control according to the eighth embodiment.
Figures 49, 50:
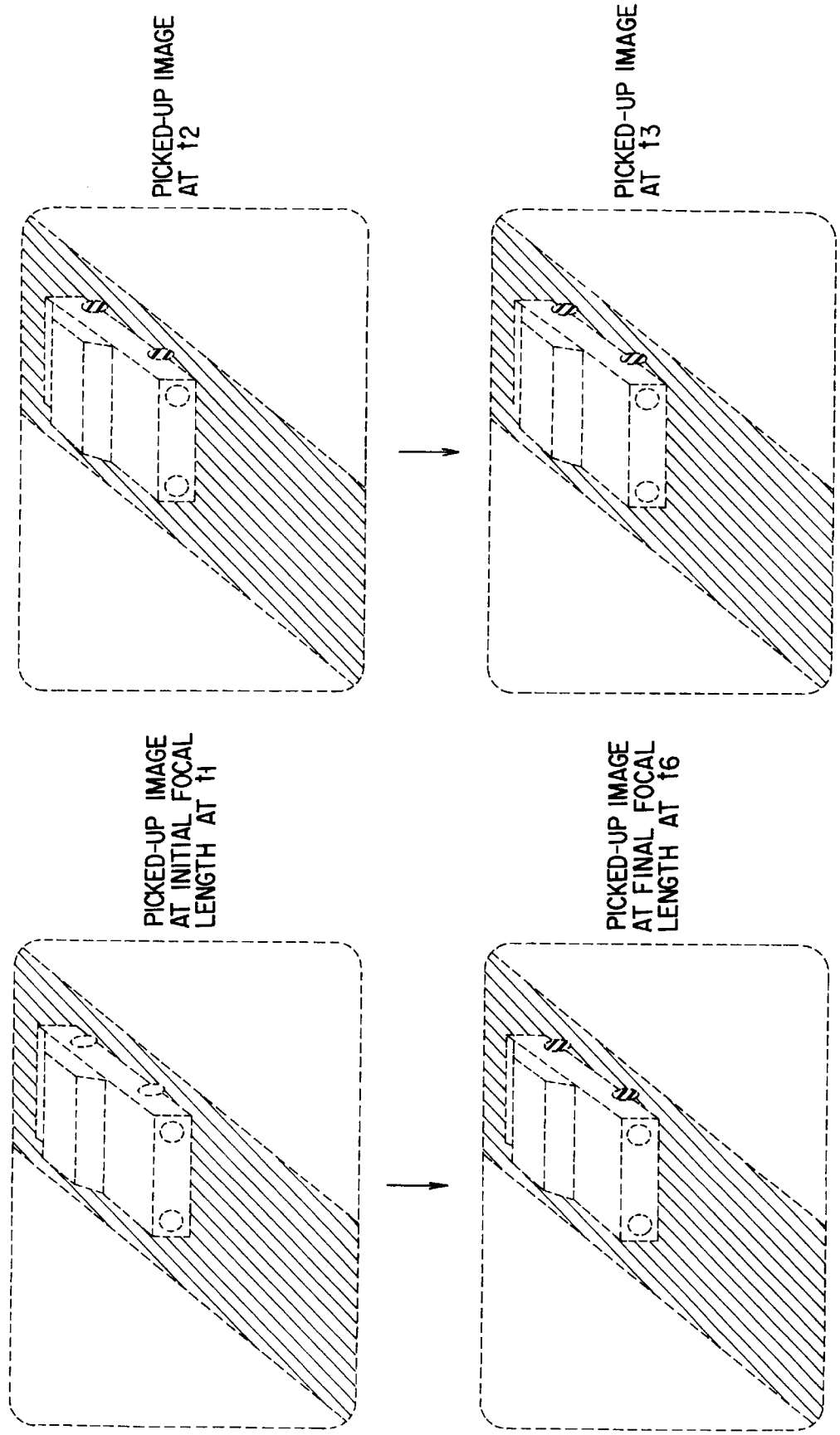
FIG. 49 is a diagram showing examples of images picked up at an initial focal length and a final focal length according to the eighth embodiment.
FIG. 50 is a diagram showing examples of images picked up at focal lengths between the initial and final focal lengths according to the eighth embodiment.
Figure 51:
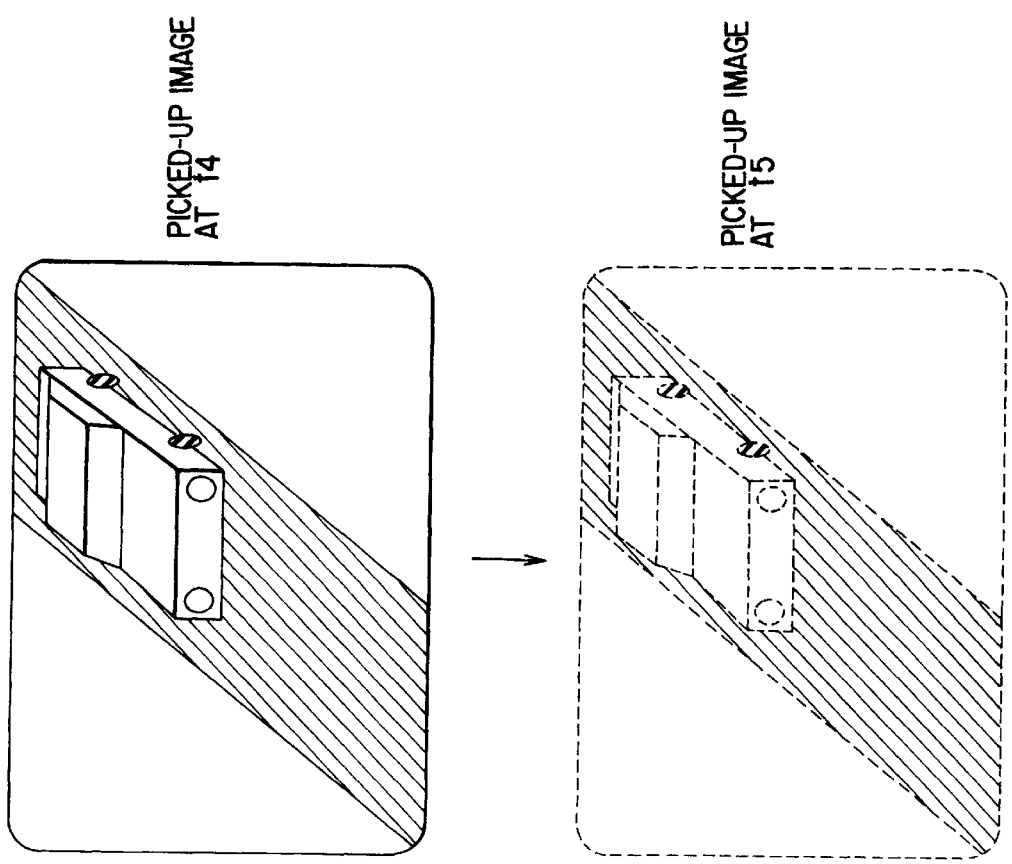
FIG. 51 is a diagram showing examples of images picked up at focal lengths between the initial and final focal lengths according to the eighth embodiment.

FIG. 47 is a timing chart showing an image fetching operation in focal length control. FIG. 48 shows the relationship between an image fetching timing and a focal length. The images picked up in the control are shown in FIGS. 49 to 51. FIG. 49 shows examples of images picked up at an initial focal length (at $t_1$) and a final focal length (at $t_6$). FIGS. 50 and 51 show examples of images picked up between $t_1$ and $t_6$, i.e., at $t_2$ to $t_5$.

Figure 52:
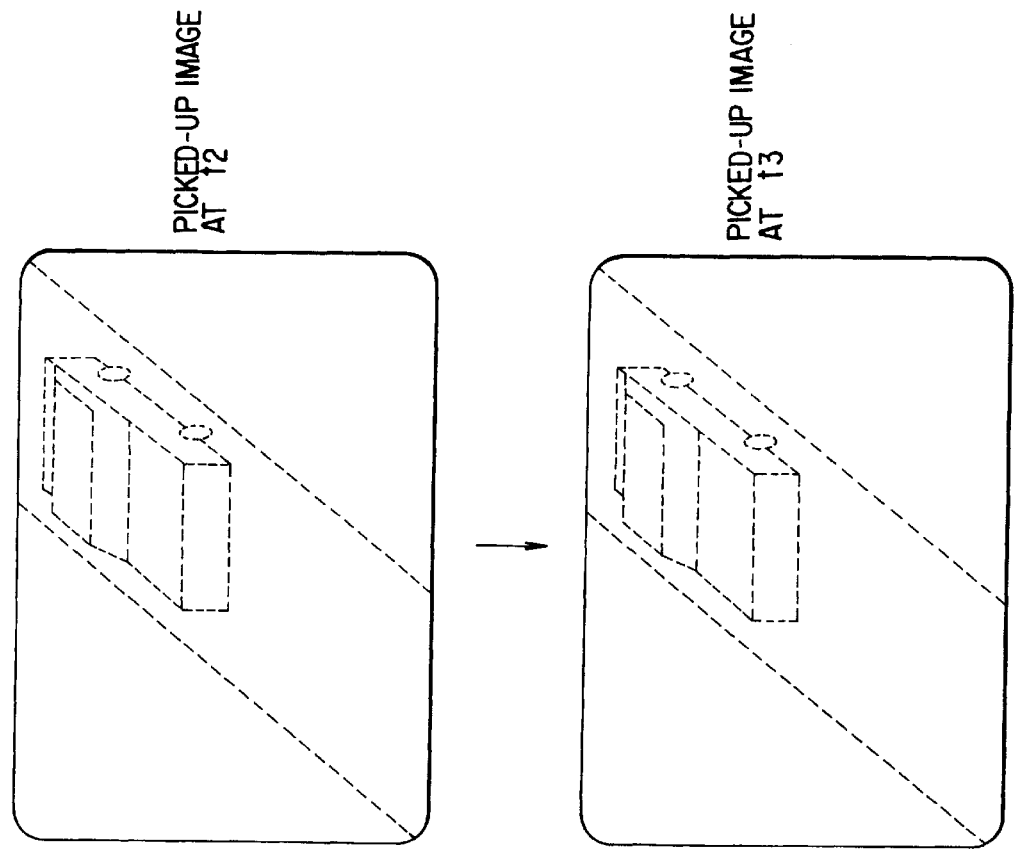
FIG. 52 is a diagram showing examples of images consisting of only high-frequency components extracted from the picked up image according to the eighth embodiment.
Figure 53:
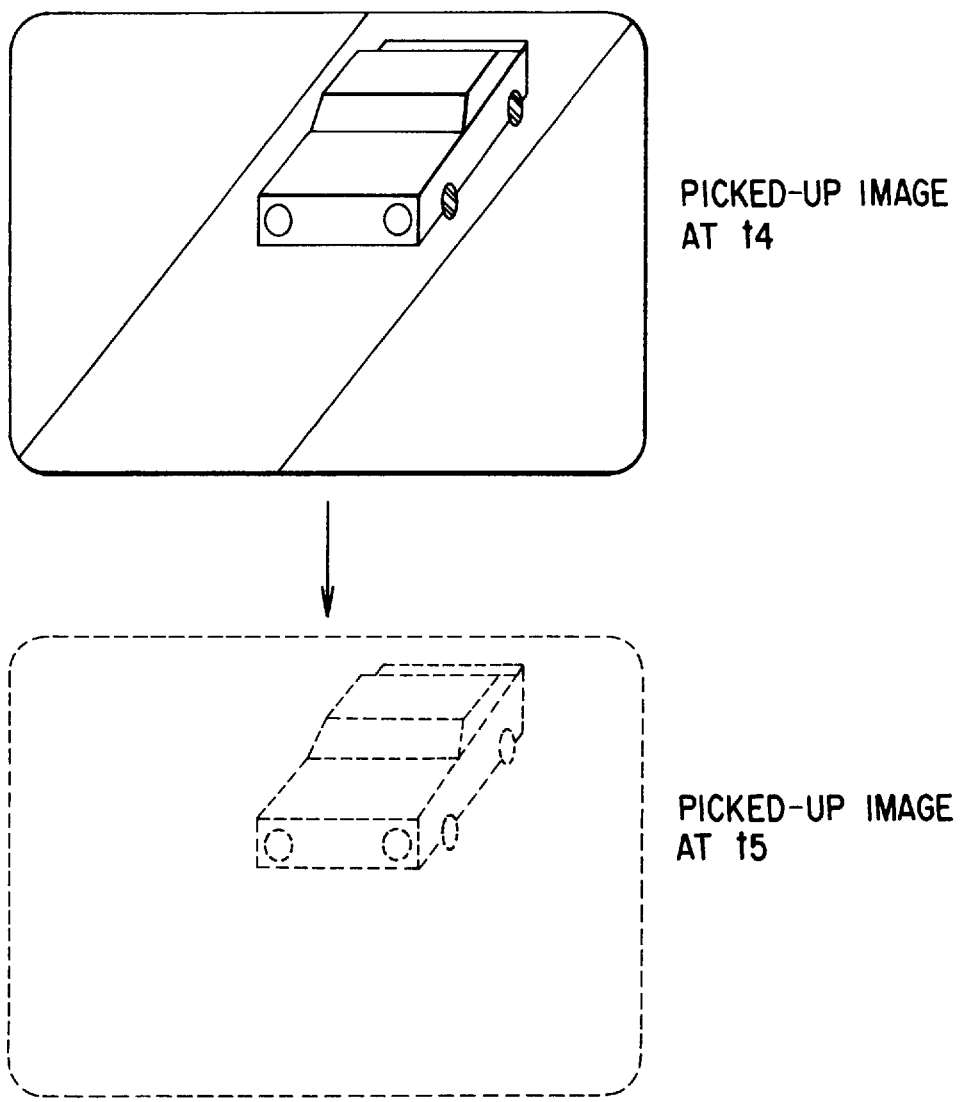
FIG. 53 is a diagram showing examples of images consisting of only high-frequency components extracted from the picked up image according to the eighth embodiment.

Subsequently, an optimal input image is selected from the series of images continuously input. In this embodiment, an image of a most suitable focus is selected. More specifically, frequency distributions of the images are analyzed and an image having a component of the highest frequency band is determined to be an optimal image. For example, input images are supplied to a high-pass filter and an image including a component of the highest frequency band is selected. FIGS. 52 and 53 show images obtained by passing the images shown in FIGS. 50 and 51 through the high-pass filter. It is understood from the images shown in FIGS. 52 and 63 that an image obtained at $t_4$ is the optimal image.

In this embodiment, frequency distributions of the respective picked-up images are obtained. An image having a component of the highest frequency band is selected and determined to be an image of the optimal focal length. A control value (optimal focal length) of the image pickup lens 2 is obtained based on the sequence ($t_4$ in this case), i.e., the time data, of the selected optimal image (ST85). According to FIG. 48, it is understood that an image of the optimal focal length is obtained at a focal length of 15 mm. Therefore, in this case, the lens control unit 18 controls the image pickup lens 2 to the focal length of 15 mm. The subsequent image pickup processes are performed with this focal length.

According to the present invention, an image of an optimal focal length can be automatically obtained within a short period of time. Therefore, the operator need not set an optimal value of the focal length as in the conventional art.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A moving object position detecting apparatus comprising:

image pickup means for picking up an image of an image pickup region including a moving object and a fixed object which serves as a reference to measure a distance, said image pickup means including an aperture variable mechanism to vary the aperture of a lens;

moving object detecting means for detecting whether the moving object is present in the image pickup region;

first fetching means for fetching the image from the image pickup means, with the aperture of the image pickup means set to a first state, thereby to discriminate between a background and the fixed object, the first fetching means including means for fetching an image in response to detection by the moving object detecting means;

second fetching means for fetching the image from the image pickup means, with the aperture of the image pickup means set to a second state which is different from said first state, thereby to discriminate between the background and the moving object, the second fetching means including means for fetching an image in response to detection by the moving detecting means;

converting means for converting the image fetched by the first and second fetching means to image data including luminance data representing image luminance;

image data adding means for adding luminance data of the image fetched by the first fetching means and converted by the converting means and luminance data of the image fetched by the second fetching means and converted by the converting means;

extracting means for extracting images of the fixed object and the moving object based on added luminance data of the image data obtained by the image data adding means; and distance calculating means for calculating a distance between the fixed object and the moving object.

2. The apparatus according to claim 1, further comprising:
 an image memory for storing images supplied from the first and second fetching means; and
 histogram producing means for producing luminance histograms of the images stored in the image memory, wherein:

the first fetching means include aperture control means for determining an optimal aperture for picking up images of the fixed object and background and controlling the aperture of the lens to the optimal aperture by means of the aperture-variable mechanism, with reference to the luminance histograms produced by the histogram producing means.

3. The apparatus according to claim 1, wherein the image data adding means include means for weighting at least one of the images fetched by the first and second fetching means in accordance with a difference between the first and second apertures, and adding the weighted image.

4. A moving object position detecting apparatus comprising:

image pickup means for picking up an image of an image pickup region including a moving object and a fixed object which serves as a reference to measure a distance, said image pickup means including an aperture variable mechanism to vary the aperture of a lens;

first fetching means for fetching the image from the image pickup means, with the aperture of the image pickup means set to a first state, thereby to discriminate between a background and the fixed object;

second fetching means for fetching the image from the image pickup means, with the aperture of the image pickup means set to a second state which is different from said first state, thereby to discriminate between the background and the moving object;

converting means for converting the image fetched by the first and second fetching means to image data including luminance data representing image luminance;

image data adding means for adding luminance data of the image fetched by the first fetching means and converted by the converting means and luminance data of the image fetched by the second fetching means and converted by the converting means;

extracting means for extracting images of the fixed object and the moving object based on added luminance data of the image data obtained by the image data adding means, the extracting means including edge extracting means for extracting desired edges of the fixed object and the moving object in the added image obtained by the image data adding means; and distance calculating means for calculating a distance between the fixed object and the moving object, the distance calculating means including translating means for translating the number of pixels between the desired edges of the fixed object and the moving object to an actual distance therebetween, based on a distance between the image pickup means and the fixed object.

5. The apparatus according to claim 1, wherein:
 the image pickup means includes:
  first image pickup means having the aperture set in the first state to discriminate between the background and the fixed object; and
  second image pickup means having the aperture set in the second state to discriminate between the background and the moving object; and wherein:
 the first fetching means include means for fetching an image from the first image pickup means; and
 the second fetching means include means for fetching an image from the second image pickup means at the same time the first fetching means fetch the image.

6. The apparatus according to claim 1, further comprising means for varying a gain of an image signal supplied from the image pickup means; wherein:

the first fetching means include means for fetching the image at a first gain which discriminates between the background and the fixed object; and the second fetching means include means for fetching the image at a second gain which discriminates between the background and the moving object.

7. The apparatus according to claim 1, wherein:

the image pickup means includes:

first image pickup means having a first image signal gain which discriminates between the background and the fixed object; and second image pickup means having a second image signal gain which discriminates between the background and the moving object; and wherein:

the first fetching means include means for fetching an image from the first image pickup means; and the second fetching means include means for fetching an image from the second image pickup means at the same time the first fetching means fetch the image.

8. A moving object position detecting apparatus comprising:

image pickup means including:
a lens; and
an aperture-variable mechanism for changing an aperture of the lens;
said image pickup means picking up an image of an image pickup region including a moving object and a fixed object which serves as a reference to measure a distance;

first fetching means for fetching the image from the image pickup means at a first aperture which discriminates between a background and the fixed object;

second fetching means comprising:
(a) aperture controlling means for controlling the aperture-variable mechanism of the image pickup means to change the aperture of the lens from the first aperture to a second aperture; and
(b) third fetching means for fetching a plurality of images at different apertures in a transient period in which the aperture of the lens is changed to the second aperture; and
(c) means for selecting an optimal image from the plurality of images fetched by the third fetching means;

image adding means for adding the images fetched by the first and second fetching means;

extracting means for extracting images of the fixed object and the moving object from an added image obtained by the image adding means; and distance calculating means for calculating a distance between the fixed object and the moving object.

9. The apparatus according to claim 8, wherein the image adding means include means for weighting at least one of the images fetched by the first and second fetching means in accordance with a difference between the first and second apertures, and adding the weighted image.

10. The apparatus according to claim 8, further comprising moving object detecting means for detecting whether the moving object is present in the image pickup region, wherein the second fetching means include means for fetching an image in reply to a detection result of the moving object detecting means.

11. A moving object position detecting apparatus comprising:

image pickup means for picking up an image of an image pickup region, said image pickup means including a lens having an aperture which can be varies;

moving object detecting means for detecting whether the moving object is present in the image pickup region;

converting means for converting the images picked up by the image pickup means to image data including luminance data representing image luminance;

storing means for storing, when the moving object detecting means detects that the moving object is present in the image pickup region, first image data picked up by the image pickup means in a state where the aperture of the image pickup means is comparatively narrow and second image data picked up by the image pickup means in a state where the aperture of the image pickup means is comparatively wide;

adding means for adding luminance data of the first and second image data stored in the storing means; and extracting means for extracting an image of a moving object based on added luminance data of the image data obtained by the image data adding means.

* * * * *